US011377586B2

(12) United States Patent
Nizamidin et al.

(10) Patent No.: US 11,377,586 B2
(45) Date of Patent: Jul. 5, 2022

(54) USE OF A BORATE-ACID BUFFER IN OIL AND GAS OPERATIONS

(71) Applicant: Chevron U.S.A. Inc., San Ramon, CA (US)

(72) Inventors: Nabijan Nizamidin, Emeryville, CA (US); Gayani W. Pinnawala, Katy, TX (US); Guo-Qing Tang, Mountain View, CA (US); Varadarajan Dwarakanath, Houston, TX (US); Gregory A. Winslow, Houston, TX (US); Jordan Taylor Isbell, Houston, TX (US); Taimur Malik, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 89 days.

(21) Appl. No.: 16/528,183

(22) Filed: Jul. 31, 2019

(65) Prior Publication Data

US 2020/0056087 A1   Feb. 20, 2020

Related U.S. Application Data

(60) Provisional application No. 62/712,944, filed on Jul. 31, 2018.

(51) Int. Cl.
*C09K 8/584* (2006.01)
*C09K 8/588* (2006.01)
*C09K 8/60* (2006.01)
*C09K 8/66* (2006.01)
*C09K 8/68* (2006.01)
(Continued)

(52) U.S. Cl.
CPC .............. *C09K 8/584* (2013.01); *C09K 8/588* (2013.01); *C09K 8/602* (2013.01); *C09K 8/665* (2013.01); *C09K 8/68* (2013.01); *C09K 8/80* (2013.01); *E21B 43/20* (2013.01); *E21B 43/26* (2013.01); *E21B 47/11* (2020.05)

(58) Field of Classification Search
CPC ......... C09K 8/584; E21B 43/20; E21B 43/26; E21B 47/1015
See application file for complete search history.

(56) References Cited

U.S. PATENT DOCUMENTS 3,788,399 A   1/1974 Feuerbacher et al.
3,811,504 A   5/1974 Flournoy et al.
(Continued)

FOREIGN PATENT DOCUMENTS

EP   0916806 A2   5/1999
EP   0962626 A2   12/1999
(Continued)

OTHER PUBLICATIONS

Al-Murayri, Mohammed T., et al., "Improving ASP Performance in Carbonate Reservoir Rocks Using Hybrid-Alkali", SPE187213-MS, Texas, USA, Oct. 9-11, 2017, pp. 1-25.
(Continued)

*Primary Examiner* — Crystal J. Lee
(74) *Attorney, Agent, or Firm* — Meunier Carlin & Curfman LLC

(57) ABSTRACT

Provided herein are compositions comprising borate-acid buffers, as well as methods of using these compositions in oil and gas operations, including enhanced oil recovery (EOR) operations, fracturing operations, stimulation operations, etc.

23 Claims, 9 Drawing Sheets

(51) Int. Cl.
*C09K 8/80* (2006.01)
*E21B 43/20* (2006.01)
*E21B 43/26* (2006.01)
*E21B 47/11* (2012.01)

(56) References Cited

U.S. PATENT DOCUMENTS

| | | | |
|---|---|---|---|
| 3,811,505 A | 5/1974 | Flournoy et al. | |
| 3,811,507 A | 5/1974 | Flournoy et al. | |
| 3,890,239 A | 6/1975 | Dycus | |
| 3,974,077 A * | 8/1976 | Free | C09K 8/685 |
| | | | 507/211 |
| 4,000,083 A | 12/1976 | Heesen | |
| 4,463,806 A | 8/1984 | Hurd et al. | |
| 4,486,340 A * | 12/1984 | Glass, Jr. | C08L 1/284 |
| | | | 166/275 |
| 5,488,148 A | 1/1996 | Weerasooriya et al. | |
| 6,022,843 A | 2/2000 | Shanks et al. | |
| 6,024,170 A * | 2/2000 | McCabe | C09K 8/206 |
| | | | 166/300 |
| 6,225,267 B1 | 5/2001 | Eckard et al. | |
| 7,629,299 B2 | 12/2009 | Berger et al. | |
| 7,770,641 B2 | 8/2010 | Dwarakanath et al. | |
| 8,211,837 B2 | 7/2012 | Weerasooriya et al. | |
| 9,347,024 B2 | 5/2016 | Smith et al. | |
| 9,422,469 B2 | 8/2016 | Dwarakanath et al. | |
| 9,605,198 B2 | 3/2017 | Shong et al. | |
| 9,617,464 B2 | 4/2017 | Dwarakanath et al. | |
| 9,840,898 B2 | 12/2017 | Kasevich et al. | |
| 9,890,627 B2 | 2/2018 | Kasevich et al. | |
| 9,896,617 B2 | 2/2018 | Dwarakanath et al. | |
| 9,902,894 B2 | 2/2018 | Dwarakanath et al. | |
| 9,902,895 B2 | 2/2018 | Dwarakanath et al. | |
| 9,909,053 B2 | 3/2018 | Dwarakanath et al. | |
| 9,914,872 B2 | 3/2018 | Wehunt et al. | |
| 9,976,072 B2 | 5/2018 | Shong et al. | |
| 2005/0199395 A1 | 9/2005 | Berger et al. | |
| 2006/0185845 A1 | 8/2006 | Shpakoff et al. | |
| 2006/0189486 A1 | 8/2006 | Shpakoff et al. | |
| 2007/0191633 A1 | 8/2007 | Berger et al. | |
| 2009/0044945 A1 | 2/2009 | Willberg et al. | |
| 2009/0112014 A1 | 4/2009 | Campbell et al. | |
| 2009/0270281 A1 | 10/2009 | Steinbrenner et al. | |
| 2010/0004843 A1 | 1/2010 | Yu et al. | |
| 2010/0292110 A1 | 11/2010 | Pope et al. | |
| 2010/0319920 A1 | 12/2010 | Pope et al. | |
| 2011/0046024 A1 | 2/2011 | Campbell et al. | |
| 2011/0048721 A1 | 3/2011 | Pope et al. | |
| 2011/0059872 A1 | 3/2011 | Weerasooriya et al. | |
| 2011/0059873 A1 | 3/2011 | Weerasooriya et al. | |
| 2011/0071057 A1 | 3/2011 | Weerasooriya et al. | |
| 2011/0100402 A1 | 5/2011 | Soane et al. | |
| 2011/0190174 A1 | 8/2011 | Weerasooriya et al. | |
| 2011/0190175 A1 | 8/2011 | Steinbrenner et al. | |
| 2011/0201531 A1 | 8/2011 | Sharma et al. | |
| 2012/0277141 A1 | 11/2012 | Smith et al. | |
| 2013/0252855 A1 | 9/2013 | Weerasooriya et al. | |
| 2014/0178324 A1 * | 6/2014 | Martinez-Castro | C07C 67/08 |
| | | | 424/70.16 |
| 2014/0288909 A1 | 9/2014 | Prestwood et al. | |
| 2015/0083420 A1 | 3/2015 | Gupta et al. | |
| 2015/0096751 A1 * | 4/2015 | Shen | C09K 8/80 |
| | | | 166/280.2 |
| 2016/0281494 A1 | 9/2016 | Shirdel et al. | |
| 2017/0158947 A1 | 6/2017 | Kim et al. | |
| 2017/0158948 A1 | 6/2017 | Kim et al. | |
| 2017/0198202 A1 | 7/2017 | Shong et al. | |
| 2018/0155505 A1 | 6/2018 | Kim et al. | |
| 2018/0202273 A1 | 7/2018 | Kasevich et al. | |

FOREIGN PATENT DOCUMENTS

| | | |
|---|---|---|
| EP | 3017014 A2 | 5/2016 |
| WO | 2008079855 A3 | 1/2009 |
| WO | 2011094442 A1 | 8/2011 |
| WO | 2012027757 A1 | 3/2012 |
| WO | 2015023963 A1 | 2/2015 |
| WO | 2019028083 A1 | 2/2019 |
| WO | 2019028085 A1 | 2/2019 |
| WO | 2019028086 A1 | 2/2019 |

OTHER PUBLICATIONS

Barnes, J. R. et al., "Application of Internal Olefin Sulfonates and Other Surfactants to EOR. Part 1: Structure—Performance Relationships for Selection at Different Reservoir Conditions", SPE Improved Oil Recovery Symposium, Society of Petroleum Engineers., Apr. 24-28, 2010 SPE-129766-MS, doi:10.2118/129766-MS, Jan. 1, 2010.

Dwarakanath, et al., ""Permeability Reduction Due to use of Liquid Polymers and Development of Remediation Options"", SPE 179657, SPE IOR Symposium in Tulsa, 2016.

PCT/US2019/044501, "International Search Report & Written Opinion", dated Sep. 12, 2019.

Zhang, Jieyuan et al., "Mechanisms of Enhanced Natural Imbibition With Novel Chemicals", Society of Petroleum Engineers. doi:10.2118/113453-PA, SPE-113453-PA, Nov. 17, 2009.

* cited by examiner

USE OF A BORATE-ACID BUFFER IN OIL AND GAS OPERATIONS

CROSS-REFERENCE TO RELATED APPLICATIONS

This application claims benefit of U.S. Provisional Application No. 62/712,944, filed Jul. 31, 2018, which is hereby incorporated herein by reference in its entirety.

BACKGROUND

Reservoir systems, such as petroleum reservoirs, typically contain fluids such as water and hydrocarbons (such as oil and gas). To remove ("produce") the hydrocarbons from the reservoir, different mechanisms can be utilized including primary, secondary or tertiary processes, fracturing, stimulation, etc. For example, in a primary recovery process, hydrocarbons are displaced from a reservoir through the high natural differential pressure between the reservoir and the bottom-hole pressure within a wellbore. In order to increase the production life of the reservoir, secondary or tertiary recovery processes can be used ("enhanced oil recovery" or EOR). Secondary recovery processes include water or gas well injection, while tertiary methods are based on injecting additional chemical compounds into the well, such as surfactants/solvents and polymers, for additional recovery. The surfactants/solvents free oil trapped in the pores of the reservoir rock, facilitate its production.

However, there remains a need for improved compositions, preparations, and methods for the production of hydrocarbons, particularly in the case of recovery processes that employ hard water.

SUMMARY

Provided herein are compositions comprising borate-acid buffers, as well as methods of using these compositions in oil and gas operations, including enhanced oil recovery (EOR) operations.

The aqueous compositions can comprise a borate-acid buffer and water. The borate-acid buffer can exhibit a capacity to buffer at a pH of from 6.0 to 8.5 (e.g., a pH of from 6.5 to 7.5). In some cases, the borate-acid buffer can exhibit a capacity to buffer at a pH below the point of zero charge of a formation into which the composition will be injected as part of an oil and gas operation. In certain embodiments, the water comprises hard water or hard brine. For example, in some cases, the water comprises at least 10 ppm at least 100 ppm, at least 500 ppm, at least 1,000 ppm, or at least 5,000 ppm, or at least 10,000 ppm of divalent metal ions chosen from $Ca^{2+}$, $Mg^{2+}$, $Sr^{2+}$, $Ba^{2+}$, and combinations thereof. In certain cases, the water comprises from 100 ppm to 25,000 ppm of divalent metal ions chosen from $Ca^{2+}$, $Mg^{2+}$, $Sr^{2+}$, $Ba^{2+}$, and combinations thereof.

Optionally, the aqueous composition can further comprise additional components for use in oil and gas operations, such as a surfactant, a polymer, a co-solvent, a friction reducer, a gelling agent, a crosslinker, a breaker, a pH adjusting agent, a non-emulsifier agent, an iron control agent, a corrosion inhibitor, a scale inhibitor, a biocide, a clay stabilizing agent, a chelating agent, a proppant, a wettability alteration chemical, or any combination thereof.

In some embodiments, the composition can comprise a borate-acid buffer, a surfactant package, and water. The surfactant package can comprise a primary surfactant and optionally one or more secondary surfactants. The aqueous composition can have a total surfactant concentration of from 0.10% to 5% by weight, based on the total weight of the aqueous composition.

In some embodiments, the composition can comprise a borate-acid buffer, a water-soluble-polymer, and water. The water-soluble polymer can comprise, for example, a polyacrylamide or a biopolymer.

The aqueous compositions can be used in oil and gas operations including enhanced oil recovery (EOR) operations (e.g., a polymer flooding operation, a surfactant flooding operation, an AS flooding operation, an AP flooding operation, a SP flooding operation, an ASP flooding operation, a conformance control operation, or any combination thereof). In some embodiments, the aqueous composition can be used in a fracturing operation. In some embodiments, the aqueous composition can be used in a stimulation operation, or any combination thereof.

For example, provided herein are methods for improving the recovery of hydrocarbons from a subterranean formation containing the hydrocarbons therewithin. These methods can comprise injecting an aqueous composition comprising (i) a borate-acid buffer, (ii) a surfactant package, a water-soluble polymer, or any combination thereof, and (iii) water into the subterranean formation through a wellbore in fluid communication with the subterranean formation. The borate-acid buffer can exhibit a capacity to buffer at a pH of from 6.0 to 8.5.

Also provided are methods of fracturing a rock matrix of an unconventional subterranean formation. These methods can comprise injecting an aqueous composition comprising (i) a borate-acid buffer, (ii) a surfactant package, a water-soluble polymer, or a combination thereof, and (iii) water into the unconventional subterranean formation through a wellbore in fluid communication with a rock matrix of the subterranean formation at a sufficient pressure to create or extend at least one fracture in the rock matrix of the unconventional subterranean formation.

Also provided are methods for stimulating a subterranean formation. These methods can comprise introducing an aqueous composition comprising (i) a borate-acid buffer, (ii) a surfactant package, a water-soluble polymer, or a combination thereof, and (iii) water into the subterranean formation through a wellbore in fluid communication with the subterranean formation; and allowing the aqueous composition to imbibe into a rock matrix of the subterranean formation for a period of time. In some embodiments, these methods can further comprise producing fluids from the subterranean formation through the wellbore.

DETAILED DESCRIPTION

Definitions

Figure 1:
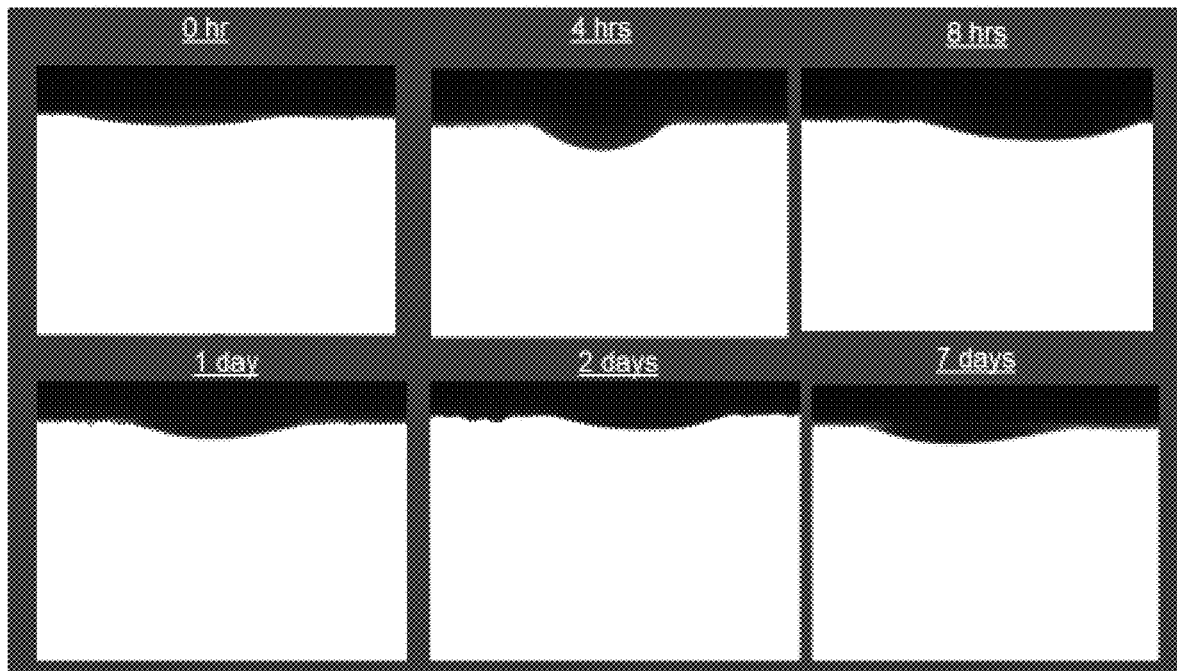
FIG. 1 shows images of oil contact angle measurements made using oil-wet carbonate samples immersed in high hardness brine (50,000 ppm TDS, with approximately 12,000 ppm $Mg^{2+}$ and $Ca^{2+}$) for various periods of time.

Unless otherwise indicated, the abbreviations used herein have their conventional meaning within the chemical and geophysical arts.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B). The phrases "combinations thereof" and "any combinations thereof are used synonymously herein.

"Hydrocarbon-bearing formation" or simply "formation" refers to the rock matrix in which a wellbore may be drilled. For example, a formation refers to a body of rock that is sufficiently distinctive and continuous such that it can be mapped. It should be appreciated that while the term "formation" generally refers to geologic formations of interest, that the term "formation," as used herein, may, in some instances, include any geologic points or volumes of interest (such as a survey area).

"Unconventional formation" is a subterranean hydrocarbon-bearing formation that generally requires intervention in order to recover hydrocarbons from the reservoir at economic flow rates or volumes. For example, an unconventional formation includes reservoirs having an unconventional microstructure in which fractures are used to recover hydrocarbons from the reservoir at sufficient flow rates or volumes (e.g., an unconventional reservoir generally needs to be fractured under pressure or have naturally occurring fractures in order to recover hydrocarbons from the reservoir at sufficient flow rates or volumes).

In some embodiments, the unconventional formation can include a reservoir having a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, 0.001 mD or less, 0.0005 mD or less, 0.0001 mD or less, 0.00005 mD or less, 0.00001 mD or less, 0.000005 mD or less, 0.000001 mD or less, or less). In some embodiments, the unconventional formation can include a reservoir having a permeability of at least 0.000001 mD (e.g., at least 0.000005 mD, at least 0.00001 mD, 0.00005 mD, at least 0.0001 mD, 0.0005 mD, 0.001 mD, at least 0.005 mD, at least 0.01 mD, at least 0.05 mD, at least 0.1 mD, at least 0.5 mD, at least 1 mD, at least 5 mD, at least 10 mD, at least 15 mD, or at least 20 mD).

The unconventional formation can include a reservoir having a permeability ranging from any of the minimum values described above to any of the maximum values described above. For example, in some embodiments, the unconventional formation can include a reservoir having a permeability of from 0.000001 mD to 25 mD (e.g., from 0.001 mD to 25 mD, from 0.001 mD to 10 mD, from 0.01 mD to 10 mD, from 0.1 mD to 10 mD, from 0.001 mD to 5 mD, from 0.01 mD to 5 mD, or from 0.1 mD to 5 mD).

The formation may include faults, fractures (e.g., naturally occurring fractures, fractures created through hydraulic fracturing, etc.), geobodies, overburdens, underburdens, horizons, salts, salt welds, etc. The formation may be onshore, offshore (e.g., shallow water, deep water, etc.), etc. Furthermore, the formation may include hydrocarbons, such as liquid hydrocarbons (also known as oil or petroleum), gas hydrocarbons, a combination of liquid hydrocarbons and gas hydrocarbons (e.g. including gas condensate), etc.

The formation, the hydrocarbons, or both may also include non-hydrocarbon items, such as pore space, connate water, brine, fluids from enhanced oil recovery, etc. The formation may also be divided up into one or more hydrocarbon zones, and hydrocarbons can be produced from each desired hydrocarbon zone.

The term formation may be used synonymously with the terms reservoir and subsurface volume of interest. For example, in some embodiments, the reservoir may be, but is not limited to, a shale reservoir, a carbonate reservoir, a tight sandstone reservoir, a tight siltstone reservoir, a gas hydrate reservoir, a coalbed methane reservoir, etc. Indeed, the terms "formation," "reservoir," "hydrocarbon," and the like are not limited to any description or configuration described herein.

"Wellbore" refers to a continuous hole for use in hydrocarbon recovery, including any openhole or uncased portion of the wellbore. For example, a wellbore may be a cylindrical hole drilled into the formation such that the wellbore is surrounded by the formation, including rocks, sands, sediments, etc. A wellbore may be used for injection. A wellbore may be used for production. A wellbore may be used for hydraulic fracturing of the formation. A wellbore even may be used for multiple purposes, such as injection and production. The wellbore may have vertical, inclined, horizontal, or any combination of trajectories. For example, the wellbore may be a vertical wellbore, a horizontal wellbore, a multilateral wellbore, or slanted wellbore. The wellbore may include a "build section." "Build section" refers to practically any section of a wellbore where the deviation is changing. As an example, the deviation is changing when the wellbore is curving. The wellbore may include a plurality of components, such as, but not limited to, a casing, a liner, a tubing string, a heating element, a sensor, a packer, a screen, a gravel pack, etc. The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. The wellbore may also include at least one artificial lift device, such as, but not limited to, an electrical submersible pump (ESP) or gas lift. Some non-limiting examples of wellbores may be found in U.S. Patent Application Publication No. 2014/0288909 and U.S. Patent Application Publication No. 2016/0281494A1, each of which is incorporated by reference in its entirety. The term wellbore is not limited to any description or configuration described herein. The term wellbore may be used synonymously with the terms borehole or well.

"Fracturing" is one way that hydrocarbons may be recovered (sometimes referred to as produced) from the formation. For example, hydraulic fracturing may entail preparing a fracturing fluid and injecting that fracturing fluid into the wellbore at a sufficient rate and pressure to open existing fractures and/or create fractures in the formation. The fractures permit hydrocarbons to flow more freely into the wellbore. In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants.

The wellbore and the formation proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. After the hydraulic fracturing process is completed, the fracturing fluid is removed by flowing or pumping it back out of the wellbore so that the fracturing fluid does not block the flow of hydrocarbons to the wellbore. The hydrocarbons will typically enter the same wellbore from the formation and go up to the surface for further processing.

The equipment to be used in preparing and injecting the fracturing fluid may be dependent on the components of the fracturing fluid, the proppants, the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and non-equipment items related to preparing the fracturing fluid and injecting the fracturing fluid.

Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process. Moreover, hydrocarbon recovery processes may also include stimulation or other treatments.

"Friction reducer," as used herein, refers to a chemical additive that alters fluid rheological properties to reduce friction created within the fluid as it flows through small-diameter tubulars or similar restrictions (e.g., valves, pumps). Generally polymers, or similar friction reducing agents, add viscosity to the fluid, which reduces the turbulence induced as the fluid flows. Reductions in fluid friction of greater than 50% are possible depending on the friction reducer utilized, which allows the injection fluid to be injected into a wellbore at a much higher injection rate (e.g., between 60 to 100 barrels per minute) and also lower pumping pressure during proppant injection.

"Injection fluid," as used herein, refers to any fluid which is injected into a reservoir via a well. The injection fluid may include one or more of a surfactant, an acid, a polymer, a friction reducer, a gelling agent, a crosslinker, a scale inhibitor, a breaker, a pH adjusting agent, a non-emulsifier agent, an iron control agent, a corrosion inhibitor, a biocide, a clay stabilizing agent, a proppant, a wettability alteration chemical, a co-solvent (e.g., a C1-C5 alcohol, or an alkoxylated C1-C5 alcohol), or any combination thereof, to increase the efficacy of the injection fluid.

"Fracturing fluid," as used herein, refers to an injection fluid that is injected into the well under pressure in order to cause fracturing within a portion of the reservoir.

The term "interfacial tension" or "IFT" as used herein refers to the surface tension between test oil and water of different salinities containing a surfactant formulation at different concentrations. Typically, interfacial tensions are measured using a spinning drop tensiometer or calculated from phase behavior experiments.

The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The term "contacting" as used herein, refers to materials or compounds being sufficiently close in proximity to react or interact. For example, in methods of contacting an unrefined petroleum material, a hydrocarbon-bearing formation, and/or a wellbore, the term "contacting" can include placing a compound (e.g., a surfactant) or an aqueous composition (e.g., chemical, surfactant or polymer) within a hydrocarbon-bearing formation using any suitable manner known in the art (e.g., pumping, injecting, pouring, releasing, displacing, spotting or circulating the chemical into a well, wellbore or hydrocarbon-bearing formation).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e., organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) (i.e., API gravity) and market price in comparison to light (or sweet) crude oils. Crude oil may also be characterized by its Equivalent Alkane Carbon Number (EACN). The term "API gravity" refers to the measure of how heavy or light a petroleum liquid is compared to water. If an oil's API gravity is greater than 10, it is lighter and floats on water, whereas if it is less than 10, it is heavier and sinks. API gravity is thus an inverse measure of the relative density of a petroleum liquid and the density of water. API gravity may also be used to compare the relative densities of petroleum liquids. For example, if one petroleum liquid floats on another and is therefore less dense, it has a greater API gravity.

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified into three groups, according to the nature of the hydrocarbons they contain. (i) Paraffin-based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil, as referred to herein, is crude oil containing natural organic acidic components (also referred to herein as unrefined petroleum acid) or their precursors such as esters or lactones. These reactive crude oils can generate soaps (carboxylates) when reacted with alkali. More terms used interchangeably for crude oil throughout this disclosure are hydrocarbons, hydrocarbon material, or active petroleum material. An "oil bank" or "oil cut" as referred to herein, is the crude oil that does not contain the injected chemicals and is pushed by the injected fluid during an enhanced oil recovery process. A "nonactive oil," as used herein, refers to an oil that is not substantially reactive or crude oil not containing significant amounts of natural organic acidic components or their precursors such as esters or lactones such that significant amounts of soaps are generated when reacted with alkali. A nonactive oil as referred to herein includes oils having an acid number of less than 0.5 mg KOH/g of oil.

"Unrefined petroleum acids" as referred to herein are carboxylic acids contained in active petroleum material (reactive crude oil). The unrefined petroleum acids contain $C_{11}$-$C_{20}$ alkyl chains, including napthenic acid mixtures. The recovery of such "reactive" oils may be performed using alkali (e.g., NaOH or $Na_2CO_3$) in a surfactant composition. The alkali reacts with the acid in the reactive oil to form soap in situ. These in situ generated soaps serve as a source of surfactants minimizing the levels of added surfactants, thus enabling efficient oil recovery from the reservoir.

The term "polymer" refers to a molecule having a structure that essentially includes the multiple repetitions of units derived, actually or conceptually, from molecules of low relative molecular mass. In some embodiments, the polymer is an oligomer.

The term "productivity" as applied to a petroleum or oil well refers to the capacity of a well to produce hydrocarbons (e.g., unrefined petroleum); that is, the ratio of the hydrocarbon flow rate to the pressure drop, where the pressure drop is the difference between the average reservoir pressure and the flowing bottom hole well pressure (i.e., flow per unit of driving force).

The term "oil solubilization ratio" is defined as the volume of oil solubilized divided by the volume of surfactant in microemulsion. All the surfactant is presumed to be in the microemulsion phase. The oil solubilization ratio is applied for Winsor type I and type III behavior. The volume of oil solubilized is found by reading the change between initial aqueous level and excess oil (top) interface level. The oil solubilization ratio is calculated as follows:

$$\sigma_o = \frac{V_o}{V_s}$$

where $\sigma_o$ is the oil solubilization ratio, $V_o$ is the volume of oil solubilized, and $V_s$ is the volume of surfactant.

The term "water solubilization ratio" is defined as the volume of water solubilized divided by the volume of surfactant in microemulsion. All the surfactant is presumed to be in the microemulsion phase. The water solubilization ratio is applied for Winsor type III and type II behavior. The volume of water solubilized is found by reading the change between initial aqueous level and excess water (bottom) interface level. The water solubilization parameter is calculated as follows:

$$\sigma_w = \frac{V_w}{V_s}$$

where $\sigma_w$ is the water solubilization ratio, $V_w$ is the volume of oil solubilized, and $V_s$ is the volume of surfactant.

The optimum solubilization ratio occurs where the oil and water solubilization ratios are equal. The coarse nature of phase behavior screening often does not include a data point at optimum, so the solubilization ratio curves are drawn for the oil and water solubilization ratio data and the intersection of these two curves is defined as the optimum. The following is true for the optimum solubilization ratio:

$$\sigma_o = \sigma_w = \sigma^*$$

where $\sigma^*$ is the optimum solubilization ratio.

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g., precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick", having a higher viscosity. More generally, the less viscous a fluid is, the greater its ease of fluidity.

The term "salinity" as used herein, refers to concentration of salt dissolved in an aqueous phases. Examples for such salts are without limitation, sodium chloride, magnesium and calcium sulfates, and bicarbonates. In more particular, the term salinity as it pertains to the present invention refers to the concentration of salts in brine and surfactant solutions.

The term "co-solvent," as used herein, refers to a compound having the ability to increase the solubility of a solute (e.g., a surfactant as disclosed herein) in the presence of an unrefined petroleum acid. In some embodiments, the co-solvents provided herein have a hydrophobic portion (alkyl or aryl chain), a hydrophilic portion (e.g., an alcohol) and optionally an alkoxy portion. Co-solvents as provided herein include alcohols (e.g., $C_1$-$C_6$ alcohols, C1-C6 diols), alkoxy alcohols (e.g., $C_1$-$C_6$ alkoxy alcohols, $C_1$-$C_6$ alkoxy diols, and phenyl alkoxy alcohols), glycol ether, glycol and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group The phrase "point of zero charge," as used herein, refers to the pH at which the surface charge (i.e., zeta potential) of a solid material, such as the rock matrix in a subterranean reservoir, is zero.

Unless otherwise specified, all percentages are in weight percent and the pressure is in atmospheres. The compositions and methods described herein relate to compositions and methods described in PCT/US2018/044715, filed Jul. 31, 2018, filed Jul. 31, 2018 entitled "Injection Fluids Comprising Anionic Surfactants for Treating Unconventional Formations"); PCT/US2018/044707, filed Jul. 31, 2018, filed Jul. 31, 2018 entitled "Injection Fluids Comprising Non-Ionic Surfactants for Treating Unconventional Formations"); and PCT/US2018/044716, filed Jul. 31, 2018, filed Jul. 31, 2018 entitled "Injection Fluids for Stimulating Fractured Formations"), all of which are hereby incorporated by reference.

Aqueous Compositions

Provided herein are aqueous compositions comprising a borate-acid buffer. In some embodiments, the composition can comprise a borate-acid buffer and water. In some embodiments, the composition can comprise a borate-acid buffer, a surfactant package, and water. In some embodiments, the composition can comprise a borate-acid buffer, a polymer, and water.

The water used to form the aqueous compositions can comprise any type of water, treated or untreated, and can vary in salt content. For example, the water can comprise sea water, brackish water, fresh water, flowback or produced water, wastewater (e.g., reclaimed or recycled), river water, lake or pond water, aquifer water, brine (e.g., reservoir or synthetic brine), or any combination thereof.

In some embodiments, the water can comprise hard water or hard brine. The hard water or hard brine comprises a divalent metal ion chosen from $Ca^{2+}$, $Mg^{2+}$, $Sr^{2+}$, $Ba^{2+}$, and combinations thereof. In certain embodiments, the hard water or hard brine can comprise at least 10 ppm at least 100 ppm, at least 500 ppm, at least 1,000 ppm, at least 5,000 ppm, or at least 10,000 ppm of divalent metal ions chosen from $Ca^{2+}$, $Mg^{2+}$, $Sr^{2+}$, $Ba^{2+}$, and combinations thereof. In certain examples, the hard water or hard brine can comprise from 100 ppm to 25,000 ppm of divalent metal ions chosen from $Ca^{2+}$, $Mg^{2+}$, $Sr^{2+}$, $Ba^{2+}$, and combinations thereof.

The borate-acid buffer serves to buffer the pH of the aqueous composition. The composition can be buffered such that a minimal addition of an acid or base to the buffered composition will not substantially impact the pH of the composition. In some embodiments, the borate-acid buffer can exhibit a capacity to buffer at a pH of from at least 6 (e.g., a pH of at least 6.25, a pH of at least 6.5, a pH. of at least 6.75, a pH of at least 7, a pH of at least 7.25, a pH of at least 7.5, a pH. of at least 7.75, a pH of at least 8, or a pH of at least 8.25). In some embodiments, the borate-acid buffer can exhibit a capacity to buffer at a pH of 8.5 or less (e.g., a pH of 8.25 or less, a pH of 8 or less, a pH of 7.75 or less, a pH of 7.5 or less, a pH of 7.25 or less, a pH of 7 or less, a pH of 6.75 or less, a pH of 6.5 or less, or a pH of 6.25 or less).

The borate-acid buffer can exhibit a capacity to buffer at a pH ranging from any of the minimum values described above to any of the maximum values described above. For example, the borate-acid buffer can exhibit a capacity to buffer at a pH of from 6 to 8.5 (e.g., from 6.5 to 7.5, from 6 to 7.5, from 6.5 to 7, or from 6 to 7).

In certain embodiments, the borate-acid buffer can exhibit a capacity to buffer at a pH of less than 8. In certain embodiments, the borate-acid buffer can exhibit a capacity to buffer at a pH of less than 7.

In some cases, the borate-acid buffer can exhibit a capacity to buffer at a pH below the point of zero charge of a formation into which the composition will be injected as part of an oil and gas operation.

In some embodiments, the aqueous composition can have a salinity of at least 5,000 ppm. In other embodiments, the aqueous composition has a salinity of at least 50,000 ppm. In other embodiments, the aqueous composition has a salinity of at least 100,000 ppm. In other embodiments, the aqueous composition has a salinity of at least 250,000 ppm. The total range of salinity (total dissolved solids in the brine) is 100 ppm to saturated brine (about 260,000 ppm).

In some embodiments, the aqueous composition can have a temperature of at least 20° C. (e.g., at least 30° C., at least 40° C., at least 50° C., at least 60° C., at least 70° C., at least 80° C., at least 90° C., at least 100° C., or at least 110° C.). The aqueous composition can have a temperature of 120° C. or less (e.g., 110° C. or less, 100° C. or less, 90° C. or less, 80° C. or less, 70° C. or less, 60° C. or less, 50° C. or less, 40° C. or less, or 30° C. or less). In some embodiments, the aqueous composition can have a temperature of greater than 120° C.

The aqueous composition can have a temperature ranging from any of the minimum values described above to any of the maximum values described above. For example, the aqueous composition can have a temperature of from 20° C. to 120° C. (e.g., from 50° C. to 120° C., or from 80° C. to 120° C.).

In some embodiments, the aqueous composition can have a viscosity of between 20 mPas and 100 mPas at 20° C. The viscosity of the aqueous solution may be increased from 0.3 mPas to 1, 2, 10, 20, 100 or even 1000 mPas by including a water-soluble polymer. The apparent viscosity of the aqueous composition may be increased with a gas (e.g., a foam forming gas) as an alternative to the water-soluble polymer.

Borate-Acid Buffers

The aqueous composition described herein include a borate-acid buffer.

In some embodiments, the borate-acid buffer can comprise a borate compound and a conjugate base of an acid.

A variety of suitable boron compounds may be used. Examples of boron compounds include Borax, Sodium tetraborate decahydrate ($Na_2B_4O_7.10H_2O$), Borax pentahydrate ($Na_2B_4O_7.5H_2O$), Kernite ($Na_2B_4O_7.4H_2O$), Borax monohydrate ($Na_2O.2B_2O_3.H_2O$), Sodium metaborate tetrahydrate ($NaBO_2.4H_2O$ or $Na_2O.B_2O_3.8H_2O$), Sodium metaborate dihydrate ($NaBO_2.2H_2O$ or $Na_2O.B_2O_3.4H_2O$), Ezcurrite ($2Na_2O.5.1B_2O_3.7H_2O$), Auger's sodium borate/Nasinite ($2Na_2O.5B_2O_3.5H_2O$), Sodium pentaborate ($Na_2O.5B_2O_3.10H_2O$), Potassium metaborate ($K_2O.B_2O_3.2.5H_2O$), Potassium tetraborate ($K_2O.2B_2O_3.8H_2O$ or $4H_2O$), Auger's potassium pentaborate ($2K_2O.5B_2O_3.5H_2O$), Potassium pentaborate ($K_2O.5B_2O_3.8H_2O$), Lithium metaborate octahydrate ($LiBO_2.8H_2O$ or $Li_2O.B_2O_3.16H_2O$), Lithium tetraborate trihydrate ($Li_2O.2B_2O_3.3H_2O$), Lithium pentaborate ($Li_2O.5B_2O_3.10H_2O$), Rubidium diborate ($Rb_2O.2B_2O_3.5H_2O$), Rubidium pentaborate ($Rb_2O.5B_2O_3.8H_2O$), Rubidium metaborate ($Rb_2O.B_2O_3.3H_2O$), Cesium Metaborate ($Cs_2O.B_2O_3.7H_2O$), Cesium diborate ($Cs_2O.2B_2O_3.5H_2O$), Cesium pentaborate ($Cs_2O.5B_2O_3.8H_2O$), Ammonium biborate (($NH_4)_2.2B_2O_3.4H_2O$), Ammonium pentaborate (($NH_4)_2O.5B_2O_3.8H_2O$), Larderellite, probably (($NH_4)_2O.5B_2O_3.4H_2O$), Ammonioborite (($NH_4)_2O.5B_2O_3.5⅓H_2O$), Kernite (Rasorite) ($Na_2B_4O_2.4H_2O$), Tincalconite (Mohavite) ($Na_2B_4O_7.5H_2O$), Borax (Tincal) ($Na_2B_4O_7.10H_2O$), Sborgite ($Na_2B_{10}O_{16}.10H_2O$), Ezcurrite ($Na_4B_{10}O_{17}.7H_2O$), Probertite (Kramerite) ($NaCaB_5O_9.5H_2O$), Ulxiete (Hayesine, Franklandite) ($NaCaB_5O_9.8H_2O$), Nobleite ($CaB_6O_{10}.4H_2O$), Gowerite ($CaB_6O_{10}.5H_2O$), Frolovite ($Ca_2B_4O_8.7H_2O$), Colemanite ($Ca_2B_6O_{11}.5H_2O$), Meyerhofferite ($Ca_2B_6O_{11}.7H_2O$), Inyoite ($Ca_2B_6O_{11}.13H_2O$), Priceite {(Pandermite) (Cryptomorphite)} ($Ca_4B_{10}O_{19}.7H_2O$), Tertschite ($Ca_4B_{10}O_{19}.20H_2O$), Ginorite ($Ca_2B_{14}O_{23}.8H_2O$), Pinnoite ($MgB_2O_4.3H_2O$), Paternoite ($MgB_8O_{13}.4H_2O$), Kurnakovite ($Mg_2B_6O_{11}.15H_2O$), Inderite (lesserite) (monoclinic) ($Mg_2B_6O_{11}.15H_2O$), Preobrazhenskite ($Mg_3B_{10}O_{18}.4½H_2O$), Hydroboracite ($CaMgB_6O_{11}.6H_2O$), Inderborite ($CaMgB_6O_{11}.11H_2O$), Kaliborite (Heintzite) ($KMg_2B_{11}O_{19}.9H_2O$), Larderellite (($NH_4)_2B_{10}O_{16}.4H_2O$), Ammonioborite (($NH_4)_2B_{10}O_{16}5⅓H_2O$), Veatchite ($SrB_6O_{10}.2H_2O$), p-Veatchite (($Sr,Ca)B_6O_{10}.2H_2O$), Teepleite (Na$_2$B$_2$O$_4$O.2Na$_2$Cl.4H$_2$O), Bandylite (CuB$_2$O$_4$.CuCl$_2$.4H$_2$O), Hilgardite (monocline) (3Ca$_2$B$_6$O$_{11}$.2CaCl$_2$.4H$_2$O), Parahilgardite (triclinic) (3Ca$_2$B$_6$O$_{11}$.2CaCl$_2$.4H$_2$O), Boracite (Mg$_5$B$_{14}$O$_{26}$MgCl$_2$), Fluoborite (Mg$_3$(BO$_3$)(F,OH)$_3$), Hambergite (Be$_2$(BO$_3$) (OH)), Sussexite ((Mn,Zn)(BO$_2$)(OH)), (Ascharite Camsellite) (Mg(BO$_2$)(OH)), Szaibelyite (Mg(BO$_2$)(OH)), Roweite ((Mn,Mg,Zn)Ca(BO$_2$)$_2$(OH)$_2$), Seamanite (Mn$_3$(PO$_4$)(BO$_3$).3H$_2$O), Wiserite (Mn$_4$B$_2$O$_5$(OH,Cl)$_4$), Luneburgite (Mg$_3$B$_2$(OH)$_6$(PO$_4$)$_2$.6H$_2$O), Cahnite (Ca$_2$B (OH)$_4$(AsO$_4$)), Sulfoborite (Mg$_6$H$_4$(BO$_3$)$_4$(SO$_4$)$_2$.7H$_2$O), Johachidolite (H$_6$Na$_2$Ca$_3$Al$_4$F$_5$B$_6$O$_{20}$), Boric Acid, Sassolite (H$_3$BO$_3$), Jeremejewite (Eichwaldite) (AlBO$_3$), Kotoite (Mg$_3$(BO$_3$)$_2$), Nordenskioldine (CaSn(BO$_3$)$_2$), Rhodizite, Warwickite ((Mg,Fe)$_3$TiB$_2$O$_6$), Ludwigite (Ferro-ludwegite, Vonsenite) ((Mg,Fe$^{II}$)$_2$Fe$^{III}$BO$_5$), Paigeite ((Fe$^{II}$,Mg)$_2$Fe$^{III}$BO$_5$), Pinakiolite (Mg$_3$Mn$^{II}$Mn$_2$$^{III}$B$_2$O$_{10}$), Axinite (2Al$_2$O$_3$.2(Fe,Mn)O.4CaO.H$_2$O.B$_2$O$_3$8SiO$_2$), Bakerite, Danburite (CaO.B$_2$O$_3$.2SiO$_2$), Datolite (2CaO.H$_2$O.B$_2$O$_3$.SiO$_2$), Dumortierite (8Al$_2$O$_3$.H$_2$OB$_2$O$_3$.6SiO$_2$), Grandidierite (11(Al,Fe,B)$_2$O$_3$.7 (Mg,Fe,Ca)O.2(H,Na,K)$_{2O}$.7SiO$_2$), Homilite (2CaO.FeO.B$_2$O$_3$.2SiO$_2$), Howlite (4CaO.5H$_{2O}$.5B$_2$O$_3$.2SiO$_2$), Hyalotekite (16(Pb,Ba,Ca) O.F.2B$_2$O$_3$.24H$_2$O), Kornerupine, Manandonite (7Al$_2$O$_3$.2Li$_2$.12H$_2$O.2B$_2$O$_3$.6SiO$_2$), Sapphirine, Searlesite (Na$_2$O.2H$_2$O.B$_2$O$_3$.4SiO$_2$), Serendibite (3Al$_2$O$_3$.2Ca.4MgO.B$_2$O$_3$.4SiO$_2$), and any combination thereof.

In certain embodiments, in boron compound can comprise a metaborate or a borax. In certain embodiments, the boron compound can comprise sodium tetraborate, calcium tetraborate, sodium borate, sodium metaborate, or any combination thereof. In embodiments, the boron compound comprises sodium metaborate. The term "sodium metaborate" as provided herein refers to the borate salt having the chemical formula NaBO$_2$4H$_2$O and in the customary sense, refers to CAS Registry No. 10555-76-7. In embodiments, the boron compound comprises borax. Other suitable compounds include, for example, barium borate or zinc borate.

The acid can comprise any suitable acid. For example, the acid can comprise acetic acid, citric acid, boric acid, tartaric acid, hydrochloric acid, succinic acid, or any combination thereof.

In some embodiments, the acid can comprise an organic acid. In some embodiment, the conjugate base of the acid comprises a chelator for a divalent metal ion (e.g., Mg$^{2+}$ or Ca$^{2+}$).

In some embodiments, the conjugate base of the acid comprises two or more heteroatoms (e.g., two or more oxygen atoms). In certain embodiments, the conjugate base comprises one or more carboxylate moieties. For example, the conjugate base can comprise acetate, citrate, tartrate, succinate, or any combination thereof.

The borate compound and the conjugate base of the organic acid can be present at a weight ratio of from 1:1 to 5:1 (e.g., from 1:1 to 3:1).

In some embodiments, the borate-acid buffer can comprise two or more different borate compounds, two or more conjugate bases of different acids, or any combination thereof. By way of illustration, the borate-acid buffer can be prepared by mixing two or more borate compounds with an acid, a borate compound with two or more acids, or two or more borate compounds with two or more acids.

In some embodiments, the borate-acid buffer comprises a borate compound, a conjugate base of a first acid, and a conjugate base of a second acid. In some cases, the first acid comprises acetic acid. In some cases, the second acid comprises an acid whose conjugate base has lower solubility in the aqueous composition than acetate. For example, the second acid can comprise citric acid.

In some embodiments, the borate-acid buffer can comprise a first borate compound, second borate compounds, and a conjugate base of an acid.

One of ordinary skill in the art will recognize that the borate-acid buffers described above can likewise be formed by combining boric acid with an alkali.

For example, borate-acid buffers can be formed by combining boric acid an alkali such as an acetate salt (e.g., sodium acetate, potassium acetate), a citrate salt (e.g., sodium citrate, potassium citrate), a tartrate salt (e.g., sodium tartrate, potassium tartrate, sodium potassium tartrate, potassium bitartrate), a hydroxide salt (e.g., sodium hydroxide, potassium hydroxide), a succinate salt (e.g., sodium succinate, potassium succinate), or any combination thereof.

In these examples, the alkali can form a conjugate acid that comprises a chelator for a divalent metal ion. In some cases, the conjugate acid can comprise two or more heteroatoms (e.g., two or more oxygen atoms). In certain cases, the conjugate acid can comprise one or more carboxylate moieties.

The borate-acid buffer can have a concentration within the aqueous composition of at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.5% by weight, at least 3% by weight, at least 3.5% by weight, at least 4% by weight, or at least 4.5% by weight), based on the total weight of the aqueous composition. In some embodiments, the borate-acid buffer can have a concentration within the aqueous composition of 5% by weight or less (e.g., 4.5% by weight or less, 4% by weight or less, 3.5% by weight or less, 3% by weight or less, 2.5% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous composition.

The borate-acid buffer can have a concentration within the aqueous composition ranging from any of the minimum values described above to any of the maximum values described above. For example, in some embodiments, the borate-acid buffer can have a concentration within the aqueous composition of from 0.01% to 5% by weight (e.g., from 0.01% to 2.5% by weight, from 0.01% to 2% by weight, from 0.05% to 5% by weight, from 0.05% to 2.5% by weight, from 0.05% to 1% by weight, or from 0.05% to 0.5% by weight), based on the total weight of the aqueous composition.

Surfactants and Surfactant Packages

In some embodiments, the aqueous composition can comprise a borate-acid buffer, a surfactant package, and water. The surfactant package can comprise a primary surfactant and optionally one or more secondary surfactants.

The primary surfactant can have a concentration within the aqueous composition of at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.5% by weight, at least 3% by weight, at least 3.5% by weight, at least 4% by weight, or at least 4.5% by weight), based on the total weight of the aqueous composition. In some embodiments, the primary surfactant can have a concentration within the aqueous composition of 5% by weight or less (e.g., 4.5% by weight or less, 4% by weight or less, 3.5% by weight or less, 3% by weight or less, 2.5% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous composition. In particular embodiments, the primary surfactant can have a concentration within the aqueous composition of less than 1%, less than 0.5%, less than 0.2%, less than 0.1%, less than 0.075%, or less than 0.05%.

The primary surfactant can have a concentration within the aqueous composition ranging from any of the minimum values described above to any of the maximum values described above. For example, in some embodiments, the primary surfactant can have a concentration within the aqueous composition of from 0.01% to 5% by weight (e.g., from 0.01% to 2.5% by weight, from 0.05% to 5% by weight, from 0.05% to 2.5% by weight, from 0.05% to 1% by weight, or from 0.05% to 0.5% by weight), based on the total weight of the aqueous composition.

When present, the one or more secondary surfactants can have a concentration within the aqueous composition of at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.5% by weight, at least 3% by weight, at least 3.5% by weight, at least 4% by weight, or at least 4.5% by weight), based on the total weight of the aqueous composition. In some embodiments, the one or more secondary surfactants can have a concentration within the aqueous composition of 5% by weight or less (e.g., 4.5% by weight or less, 4% by weight or less, 3.5% by weight or less, 3% by weight or less, 2.5% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous composition. In particular embodiments, the one or more secondary surfactants can have a concentration within the aqueous composition of less than 1%, less than 0.5%, less than 0.2%, less than 0.1%, less than 0.075%, or less than 0.05%.

The one or more secondary surfactants can have a concentration within the aqueous composition ranging from any of the minimum values described above to any of the maximum values described above. For example, in some embodiments, the one or more secondary surfactants can have a concentration within the aqueous composition of from 0.01% to 5% by weight (e.g., from 0.01% to 2.5% by weight, from 0.05% to 5% by weight, from 0.05% to 2.5% by weight, from 0.05% to 1% by weight, or from 0.05% to 0.5% by weight), based on the total weight of the aqueous composition.

In some embodiments, the primary surfactant and one or more secondary surfactants can be present in the aqueous composition at a weight ratio of primary surfactant to one or more secondary surfactants of at least 1:1 (e.g., at least 2:1, at least 2.5:1, at least 3:1, at least 4:1, at least 5:1, at least 6:1, at least 7:1, at least 8:1, or at least 9:1). In some embodiments, the primary surfactant and one or more secondary surfactants can be present in the aqueous composition in a weight ratio of primary surfactant to one or more secondary surfactants of 10:1 or less (e.g., 9:1 or less; 8:1 or less, 7:1 or less, 6:1 or less, 5:1 or less, 4:1 or less, 3:1 or less, 2.5:1 or less, or 2:1 or less).

The primary surfactant and one or more secondary surfactants can be present in the aqueous composition in a weight ratio ranging from any of the minimum values described above to any of the maximum values described above. For example, the primary surfactant and one or more secondary surfactants can be present in the aqueous composition in a weight ratio of primary surfactant to one or more secondary surfactants of from 1:1 to 10:1 (e.g., 1:1 to 5:1).

In other embodiments, the one or more secondary surfactants are absent (i.e., the primary surfactant is the only surfactant present in the aqueous composition).

In some embodiments, the total concentration of all surfactants in the aqueous composition (the total concentration of the primary surfactant and the one or more secondary surfactants in the aqueous composition) can be at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.25% by weight, at least 2.5% by weight, at least 2.75% by weight, at least 3% by weight, at least 3.25% by weight, at least 3.5% by weight, at least 3.75% by weight, at least 4% by weight, at least 4.25% by weight, at least 4.5% by weight, or at least 4.75% by weight), based on the total weight of the aqueous composition. In some embodiments, the total concentration of all surfactants in the aqueous composition (the total concentration of the primary surfactant and the one or more secondary surfactants in the aqueous composition) can be 5% by weight or less (e.g., 4.75% by weight or less, 4.5% by weight or less, 4.25% by weight or less, 4% by weight or less, 3.75% by weight or less, 3.5% by weight or less, 3.25% by weight or less, 3% by weight or less, 2.75% by weight or less, 2.5% by weight or less, 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous composition.

The total concentration of all surfactants in the aqueous composition (the total concentration of the primary surfactant and the one or more secondary surfactants in the aqueous composition) can range from any of the minimum values described above to any of the maximum values described above. For example, in some embodiments, the total concentration of all surfactants in the aqueous composition (the total concentration of the primary surfactant and the one or more secondary surfactants in the aqueous composition) can be from 0.01% by weight to 5% by weight (e.g., from 0.01% to 2.5% by weight, from 0.01% to 1% by weight, or from 0.01% to 0.5% by weight).

The primary surfactant can comprise an anionic surfactant or a non-ionic surfactant. The one or more secondary surfactants can comprise one or more non-ionic surfactants, one or more anionic surfactants, one or more cationic surfactants, one or more zwitterionic surfactants, or any combination thereof.

In some embodiments, the surfactant package can comprise an anionic surfactant. In other embodiments, the surfactant package can consist essentially of an anionic surfactant (i.e., the anionic surfactant is the only surfactant present in the surfactant package). In other embodiments, the surfactant package can consist of an anionic surfactant.

In some embodiments, the surfactant package can comprise a non-ionic surfactant. In other embodiments, the surfactant package can consist essentially of a non-ionic surfactant (i.e., the non-ionic surfactant is the only surfactant present in the surfactant package). In other embodiments, the surfactant package can consist of a non-ionic surfactant.

In some embodiments, the surfactant package can comprise an anionic surfactant and a non-ionic surfactant. In other embodiments, the surfactant package can consist essentially of an anionic surfactant and a non-ionic surfactant (i.e., the anionic surfactant and the non-ionic surfactant are the only surfactants present in the surfactant package). In other embodiments, the surfactant package can consist of an anionic surfactant and a non-ionic surfactant.

In some embodiments, the surfactant package can comprise an anionic surfactant, a second anionic surfactant, and a non-ionic surfactant. In other embodiments, the surfactant package can consist essentially of an anionic surfactant, a second anionic surfactant, and a non-ionic surfactant (i.e., the anionic surfactant, the second anionic surfactant, and the non-ionic surfactant are the only surfactants present in the surfactant package). In other embodiments, the surfactant package can consist of an anionic surfactant, a second anionic surfactant, and a non-ionic surfactant.

Suitable anionic surfactants include a hydrophobic tail that comprises from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some examples, the anionic surfactant can comprise an internal olefin sulfonate (IOS), an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di)sulfonate, an alcohol sulfate, an alkoxy sulfate, an alkoxy sulfonate, an alkoxy carboxylate, an alcohol phosphate, or an alkoxy phosphate. In some embodiments, the anionic surfactant can comprise an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant.

An "alkoxy carboxylate surfactant" or "alkoxy carboxylate" refers to a compound having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —COO$^-$ or acid or salt thereof including metal cations such as sodium. In embodiments, the alkoxy carboxylate surfactant can be defined by the formulae below:

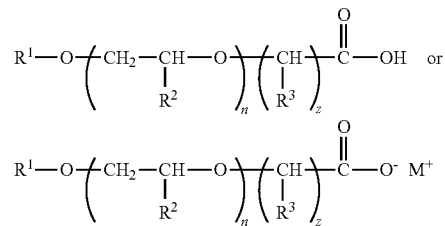

wherein $R^1$ is substituted or unsubstituted C6-C36 alkyl or substituted or unsubstituted aryl; $R^2$ is, independently for each occurrence within the compound, hydrogen or unsubstituted C1-C6 alkyl; $R^3$ is independently hydrogen or unsubstituted C1-C6 alkyl, n is an integer from 0 to 175, z is an integer from 1 to 6 and $M^+$ is a monovalent, divalent or trivalent cation. In some of these embodiments, $R^1$ can be an unsubstituted linear or branched C6-C36 alkyl.

In certain embodiments, the alkoxy carboxylate can be a C6-C32:PO(0-65):EO(0-100)-carboxylate (i.e., a C6-C32 hydrophobic tail, such as a branched or unbranched C6-C32 alkyl group, attached to from 0 to 65 propyleneoxy groups (—CH$_2$—CH(methyl)-O— linkers), attached in turn to from 0 to 100 ethyleneoxy groups (—CH$_2$—CH$_2$—O— linkers), attached in turn to —COO$^-$ or an acid or salt thereof including metal cations such as sodium). In certain embodiments, the alkoxy carboxylate can be a branched or unbranched C6-C30:PO(30-40):EO(25-35)-carboxylate. In certain embodiments, the alkoxy carboxylate can be a branched or unbranched C6-C12:PO(30-40):EO(25-35)-carboxylate. In certain embodiments, the alkoxy carboxylate can be a branched or unbranched C6-C30:EO(8-30)-carboxylate.

An "alkoxy sulfate surfactant" or "alkoxy sulfate" refers to a surfactant having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —SO$_3^-$ or acid or salt thereof including metal cations such as sodium. In some embodiment, the alkoxy sulfate surfactant has the formula R—(BO)$_e$—(PO)$_f$-(EO)$_g$—SO$_3^-$ or acid or salt (including metal cations such as sodium) thereof, wherein R is C6-C32 alkyl, BO is —CH$_2$—CH(ethyl)-O—, PO is —CH$_2$—CH(methyl)-O—, and EO is —CH$_2$—CH$_2$—O—. The symbols e, f and g are integers from 0 to 50 wherein at least one is not zero.

In embodiments, the alkoxy sulfate surfactant can be an aryl alkoxy sulfate surfactant. The aryl alkoxy surfactant can be an alkoxy surfactant having an aryl attached to one or more alkoxylene groups (typically —CH$_2$—CH(ethyl)-O—, —CH$_2$—CH(methyl)-O—, or —CH$_2$—CH$_2$—O—) which, in turn is attached to —SO$_3^-$ or acid or salt thereof including metal cations such as sodium.

An "alkyl sulfonate surfactant" or "alkyl sulfonate" refers to a compound that includes an alkyl group (e.g., a branched or unbranched C6-C32 alkyl group) attached to —SO$_3^-$ or acid or salt thereof including metal cations such as sodium.

An "aryl sulfate surfactant" or "aryl sulfate" refers to a compound having an aryl group attached to —O—SO$_3^-$ or acid or salt thereof including metal cations such as sodium. An "aryl sulfonate surfactant" or "aryl sulfonate" refers to a compound having an aryl group attached to —SO$_3^-$ or acid or salt thereof including metal cations such as sodium. In some cases, the aryl group can be substituted, for example, with an alkyl group (an alkyl aryl sulfonate).

An "internal olefin sulfonate," "isomerized olefin sulfonate," or "IOS" refers to an unsaturated hydrocarbon compound comprising at least one carbon-carbon double bond and at least one SO$_3^-$ group, or a salt thereof. As used herein, a "C20-C28 internal olefin sulfonate," "a C20-C28 isomerized olefin sulfonate," or "C20-C28 IOS" refers to an IOS, or a mixture of IOSs with an average carbon number of 20 to 28, or of 23 to 25. The C20-C28 IOS may comprise at least 80% of IOS with carbon numbers of 20 to 28, at least 90% of IOS with carbon numbers of 20 to 28, or at least 99% of IOS with carbon numbers of 20 to 28. As used herein, a "C15-C18 internal olefin sulfonate," "C15-C18 isomerized olefin sulfonate," or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching. In certain embodiments, C15-18 IOS may be added to the surfactant package when the LPS injection fluid is intended for use in high temperature unconventional subterranean formations, such as formations above 130° F. (approximately 55° C.). The IOS may be at least 20% branching, 30% branching, 40% branching, 50% branching, 60% branching, or 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication 2009/0112014, and SPE 129766, all incorporated herein by reference.

In embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a C6-C36 linear or branched alkyl group. In embodiments, the anionic surfactant can be an alkylbenzene sulfonate or a dibenzene disufonate. In embodiments, the anionic surfactant can be benzenesulfonic acid, decyl(sulfophenoxy)-disodium salt; linear or branched C6-C36 alkyl: PO(0-65):EO(0-100) sulfate; or linear or branched C6-C36 alkyl:PO(0-65):EO(0-100) carboxylate. In embodiments, the anionic surfactant is an isomerized olefin sulfonate (C6-C30), internal olefin sulfonate (C6-C30) or internal olefin disulfonate (C6-C30). In some embodiments, the anionic surfactant is a Guerbet-PO(0-65)-EO(0-100) sulfate (Guerbet portion can be C6-C36). In some embodiments, the anionic surfactant is a Guerbet-PO(0-65)-EO(0-100) carboxylate (Guerbet portion can be C6-C36). In some embodiments, the anionic surfactant is alkyl PO(0-65) and EO(0-100) sulfonate: where the alkyl group is linear or branched C6-C36. In some embodiments, the anionic surfactant is a sulfosuccinate, such as a dialkylsulfosuccinate. In some embodiments, the anionic surfactant is an alkyl aryl sulfonate (AAS) (e.g. an alkyl benzene sulfonate (ABS)), a C10-C30 internal olefin sulfate (IOS), a petroleum sulfonate, or an alkyl diphenyl oxide (di) sulfonate.

In some examples, the anionic surfactant can comprise a surfactant defined by the formula below:

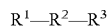

wherein R$^1$ comprises a branched or unbranched, saturated or unsaturated, cyclic or non-cyclic, hydrophobic carbon chain having 6-32 carbon atoms and an oxygen atom linking R$^1$ and R$^2$; R$^2$ comprises an alkoxylated chain comprising at least one oxide group selected from the group consisting of ethylene oxide, propylene oxide, butylene oxide, and combinations thereof; and R$^3$ comprises a branched or unbranched hydrocarbon chain comprising 2-12 carbon atoms and from 2 to 5 carboxylate groups.

In some examples, the anionic surfactant can comprise a surfactant defined by the formula below:

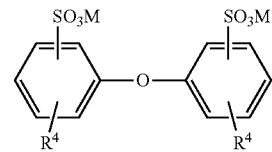

wherein R$^4$ is, individually for each occurrence, a branched or unbranched, saturated or unsaturated, cyclic or non-cyclic, hydrophobic carbon chain having 6-32 carbon atoms; and M represents a counterion (e.g., Na$^+$, K$^+$). In some embodiments, R$^4$ is a branched or unbranched, saturated or unsaturated, cyclic or non-cyclic, hydrophobic carbon chain having 6-16 carbon atoms.

Suitable non-ionic surfactants include compounds that can be added to increase wettability. In embodiments, the hydrophilic-lipophilic balance (HLB) of the non-ionic surfactant is greater than 10 (e.g., greater than 9, greater than 8, or greater than 7). In some embodiments, the HLB of the non-ionic surfactant is from 7 to 10.

The non-ionic surfactant can comprise a hydrophobic tail comprising from 6 to 60 carbon atoms. In some embodiments, the non-ionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the non-ionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The non-ionic surfactant can include a hydrophobic tail that comprises a number of carbon atoms ranging from any of the minimum values described above to any of the maximum values described above. For example, the non-ionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. In some cases, the hydrophobic tail may be a straight chain, branched chain, and/or may comprise cyclic structures. The hydrophobic carbon tail may comprise single bonds, double bonds, triple bonds, or any combination thereof. In some cases, the hydrophobic tail can comprise an alkyl group, with or without an aromatic ring (e.g., a phenyl ring) attached to it. In some embodiments, the hydrophobic tail can comprise a branched hydrophobic tail derived from Guerbet alcohols.

Example non-ionic surfactants include alkyl aryl alkoxy alcohols, alkyl alkoxy alcohols, or any combination thereof. In embodiments, the non-ionic surfactant may be a mix of surfactants with different length lipophilic tail chain lengths. For example, the non-ionic surfactant may be C9-C11:9EO, which indicates a mixture of non-ionic surfactants that have a lipophilic tail length of 9 carbon to 11 carbon, which is followed by a chain of 9 EOs. The hydrophilic moiety is an alkyleneoxy chain (e.g., an ethoxy (EO), butoxy (BO) and/or propoxy (PO) chain with two or more repeating units of EO, BO, and/or PO). In some embodiments, 1-100 repeating units of EO are present. In some embodiments, 0-65 repeating units of PO are present. In some embodiments, 0-25 repeating units of BO are present. For example, the non-ionic surfactant could comprise 10EO:5PO or 5EO. In embodiments, the non-ionic surfactant may be a mix of surfactants with different length lipophilic tail chain lengths. For example, the non-ionic surfactant may be C9-C11:PO9:EO2, which indicates a mixture of non-ionic surfactants that have a lipophilic tail length of 9 carbon to 11 carbon, which is followed by a chain of 9 POs and 2 EOs. In specific embodiments, the non-ionic surfactant is linear C9-C11:9EO. In some embodiments, the non-ionic surfactant is a Guerbet PO(0-65) and EO(0-100) (Guerbet can be C6-C36); or alkyl PO(0-65) and EO(0-100): where the alkyl group is linear or branched C1-C36. In some examples, the non-ionic surfactant can comprise a branched or unbranched C6-C32:PO(0-65):EO(0-100) (e.g., a branched or unbranched C6-C30:PO(30-40):EO(25-35), a branched or unbranched C6-C12:PO(30-40):EO(25-35), a branched or unbranched C6-30:EO(8-30), or any combination thereof). In some embodiments, the non-ionic surfactant is one or more alkyl polyglucosides.

Example cationic surfactants include surfactant analogous to those described above, except bearing primary, secondary, or tertiary amines, or quaternary ammonium cations, as a hydrophilic head group. "Zwitterionic" or "zwitterion" as used herein refers to a neutral molecule with a positive (or cationic) and a negative (or anionic) electrical charge at different locations within the same molecule. Example zwitterionic surfactants include betains and sultains.

Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211, 837, 9,422,469, 9,605,198, and 9,617,464; WIPO Patent Application Nos. WO/2008/079855, WO/2012/027757 and WO/2011/094442; as well as U.S. Patent Application Nos. 2005/0199395, 2006/0185845, 2006/0189486, 2009/0270281, 2011/0046024, 2011/0100402, 2011/0190175, 2007/0191633, 2010/004843. 2011/0201531, 2011/0190174, 2011/0071057, 2011/0059873, 2011/0059872, 2011/0048721, 2010/0319920, 2010/0292110, and 2017/0198202, each of which is hereby incorporated by reference herein in its entirety for its description of example surfactants.

In some embodiments, the surfactant package (and by extension the aqueous composition) can comprise a non-ionic surfactant and an anionic surfactant (e.g., a sulfonate or disulfonate). In some embodiments, the surfactant package (and by extension the aqueous composition) can comprise a non-ionic surfactant and two or more anionic surfactants (e.g., a sulfonate or disulfonate and a carboxylate). In some embodiments, the surfactant package (and by extension the aqueous composition) can comprise a non-ionic surfactant (e.g., a C6-C16 alkyl phenol ethoxylate, or a C6-C16:PO(0-25):EO(0-25), such as a C9-C11 ethoxylated alcohol, a C13 ethoxylated alcohol, a C6-C10 ethoxylated propoxylated alcohol, or a C10-C14 ethoxylated Guerbet alcohol) and a sulfonate surfactant (e.g., a C10-16 disulfonate, or a C16-28 IOS). In some embodiments, the surfactant package (and by extension the aqueous composition) can comprise a non-ionic surfactant (e.g., a C6-C16 alkyl phenol ethoxylate, or a C6-16:PO(0-25):EO(0-25), such as a C9-C11 ethoxylated alcohol, a C13 ethoxylated alcohol, a C6-C10 ethoxylated propoxylated alcohol, or a C10-C14 ethoxylated Guerbet alcohol), a sulfonate surfactant (e.g., a C10-16 disulfonate, or a C16-28 IOS), and a carboxylate surfactant (e.g., a C10-16 alkyl polyglucoside carboxylate or a C22-C36 Guerbet alkoxylated carboxylate).

Specific example embodiments include aqueous compositions comprising the surfactant packages in the table below.

| Example | Surfactants and Co-Solvents in Aqueous Composition (in weight percent) |
|---|---|
| 1 | 0.09% alkoxylated C6-C16 alcohol<br>0.06% disulfonate |
| 2 | 0.1% alkoxylated C6-C16 alcohol<br>0.1% carboxylate<br>0.1% disulfonate |
| 3 | 0.15% alkoxylated C6-C16 alcohol<br>0.075% carboxylate<br>0.075% disulfonate |
| 4 | 0.2% alkoxylated C6-C16 alcohol<br>0.1% carboxylate |
| 5 | 0.2% alkoxylated C6-C16 alcohol<br>0.033% carboxylate<br>0.066% disulfonate |
| 6 | 0.2% alkoxylated C6-C16 alcohol<br>0.033% carboxylate<br>0.066% disulfonate |

| Example | Surfactants and Co-Solvents in Aqueous Composition (in weight percent) |
|---|---|
| 7 | 0.2% alkoxylated C6-C16 alcohol<br>0.05% carboxylate<br>0.05% olefin sulfonate |
| 8 | 0.15% alkoxylated C6-C16 alcohol<br>0.05% carboxylate<br>0.05% olefin sulfonate<br>0.05% alkyl polyglucoside |
| 9 | 0.1% alkoxylated C6-C16 alcohol<br>0.05% carboxylate<br>0.05% olefin sulfonate<br>0.1% alkyl polyglucoside |
| 10 | 0.15% alkoxylated C6-C16 alcohol<br>0.07% carboxylate<br>0.03% olefin sulfonate<br>0.1% alkyl polyglucoside |
| 11 | 0.1% alkoxylated C6-C16 alcohol<br>0.04% carboxylate<br>0.05% olefin sulfonate<br>0.03% disulfonate<br>0.1% alkyl polyglucoside |
| 12 | 0.1% alkoxylated C6-C16 alcohol<br>0.04% carboxylate<br>0.06% disulfonate<br>0.1% alkyl polyglucoside |
| 13 | 0.15% alkoxylated C6-C16 alcohol<br>0.15% alkoxylated alkylphenol<br>0.1% olefin sulfonate<br>0.1% Guerbet alkoxylated carboxylate |
| 14 | 0.125% alkoxylated C6-C16 alcohol<br>0.175% alkoxylated alkylphenol<br>0.1% olefin sulfonate<br>0.1% Guerbet alkoxylated carboxylate |
| 15 | 0.1% alkoxylated C6-C16 alcohol<br>0.2% alkoxylated alkylphenol<br>0.1% olefin sulfonate<br>0.1% Guerbet alkoxylated carboxylate |
| 16 | 0.12% alkoxylated C6-C16 alcohol<br>0.22% alkoxylated alkylphenol<br>0.08% olefin sulfonate<br>0.08% Guerbet alkoxylated carboxylate |
| 17 | 0.15% alkoxylated C6-C16 alcohol<br>0.15% alkoxylated alkylphenol<br>0.08% olefin sulfonate<br>0.06% Guerbet alkoxylated carboxylate<br>0.06% carboxylate |
| 18 | 0.15% alkoxylated C6-C16 alcohol<br>0.15% alkoxylated alkylphenol<br>0.05% olefin sulfonate<br>0.1% Guerbet alkoxylated carboxylate<br>0.05% disulfonate |
| 19 | 0.5% olefin sulfonate<br>0.5% Guerbet alkoxylated carboxylate<br>0.55% glycosides or glucosides |
| 20 | 0.5% olefin sulfonate<br>0.5% Guerbet alkoxylated carboxylate<br>0.5% glycosides or glucosides<br>0.25% alkoxylated C6-C16 alcohol |
| 21 | 0.5% olefin sulfonate<br>0.5% Guerbet alkoxylated carboxylate<br>0.5% glycosides or glucosides<br>0.5% alkoxylated C6-C16 alcohol |
| 22 | 0.5% olefin sulfonate<br>0.5% Guerbet alkoxylated carboxylate<br>1% glycosides or glucosides<br>0.5% alkoxylated C6-C16 alcohol |
| 23 | 0.05% olefin sulfonate<br>0.05% Guerbet alkoxylated carboxylate<br>0.05% glycosides or glucosides<br>0.05% alkoxylated C6-C16 alcohol |
| 24 | 0.075% glycosides or glucosides<br>0.075% alkoxylated C6-C16 alcohol |
| 25 | 0.1% alkoxylated C6-C16 alcohol<br>0.05% disulfonate |
| 26 | 0.1% alkoxylated C6-C16 alcohol<br>0.05% disulfonate<br>0.03% hydroxyalkyl alkylammonium chloride |
| 27 | 0.03% olefin sulfonate<br>0.04% Guerbet alkoxylated carboxylate<br>0.08% glycosides or glucosides<br>0.05% alkoxylated C6-C16 alcohol |
| 28 | 0.4% olefin sulfonate<br>0.4% Guerbet alkoxylated carboxylate<br>0.7% glycosides or glucosides<br>0.5% alkoxylated C6-C16 alcohol |
| 29 | 0.05% olefin sulfonate<br>0.1% glycosides or glucosides<br>0.05% alkoxylated C6-C16 alcohol |
| 30 | 0.05% olefin sulfonate<br>0.1% alkyl polyglucoside<br>0.05% alkoxylated C6-C16 alcohol |
| 31 | 0.05% olefin sulfonate<br>0.1% glycosides or glucosides<br>0.05% alkoxylated C6-C16 alcohol |
| 32 | 0.05% olefin sulfonate<br>0.1% alkyl polyglucoside<br>0.05% alkoxylated C6-C16 alcohol |
| 33 | 0.05% olefin sulfonate<br>0.1% alkyl polyglucoside<br>0.05% alkoxylated C6-C16 alcohol |
| 34 | 0.05% olefin sulfonate<br>0.05% glycosides or glucosides<br>0.05% alkoxylated C6-C16 alcohol<br>0.05% carboxylate |
| 35 | 0.05% olefin sulfonate<br>0.05% glycosides or glucosides<br>0.05% alkoxylated C6-C16 alcohol<br>0.05% carboxylate |
| 36 | 0.05% olefin sulfonate<br>0.05% alkyl polyglucoside<br>0.05% alkoxylated C6-C16 alcohol |
| 37 | 0.06% olefin sulfonate<br>0.05% alkyl polyglucoside<br>0.04% alkoxylated C6-C16 alcohol |
| 38 | 0.04% olefin sulfonate<br>0.08% glycosides or glucosides<br>0.05% alkoxylated C6-C16 alcohol<br>0.03% disulfonate |
| 39 | 0.035% olefin sulfonate<br>0.075% glycosides or glucosides<br>0.05% alkoxylated C6-C16 alcohol<br>0.04% disulfonate |
| 40 | 0.035% olefin sulfonate<br>0.07% glycosides or glucosides<br>0.045% alkoxylated C6-C16 alcohol<br>0.05% disulfonate |
| 41 | 0.1% alkoxylated C6-C16 alcohol<br>0.1% disulfonate |
| 42 | 0.25% Guerbet alkoxylated carboxylate<br>0.25% olefin sulfonate<br>0.5% glycosides or glucosides<br>0.5% co-solvent |
| 43 | 0.075% alkoxylated C12-C22 alcohol<br>0.075% disulfonate |
| 44 | 0.075% alkoxylated C6-C16 Guerbet alcohol<br>0.075% disulfonate |
| 45 | 0.075% alkoxylated C6-C16 Guerbet alcohol<br>0.075% disulfonate |
| 46 | 0.075% alkoxylated C6-C16 alcohol<br>0.075% disulfonate |
| 47 | 0.075% disulfonate<br>0.075% alkoxylated C6-C16 alcohol |
| 48 | 0.0625% disulfonate<br>0.0875% alkoxylated C6-C16 alcohol |
| 49 | 0.055% disulfonate<br>0.095% alkoxylated C6-C16 alcohol |
| 50 | 0.075% disulfonate<br>0.075% alkoxylated C6-C16 alcohol |

| Example | Surfactants and Co-Solvents in Aqueous Composition (in weight percent) |
|---|---|
| 51 | 1% alkoxylated C6-C16 alcohol<br>0.5% disulfonate |
| 52 | 1% alkoxylated C6-C16 alcohol |
| 53 | 1% alkoxylated C6-C16 alcohol<br>2.25% sulfosuccinate |
| 54 | 0.25% Guerbet alkoxylated carboxylate<br>1% alkoxylated C6-C16 alcohol<br>2.25% sulfosuccinate |
| 55 | 0.25% Guerbet alkoxylated carboxylate<br>1% alkoxylated alkylphenol<br>2.25% sulfosuccinate |
| 56 | 0.25% Guerbet alkoxylated carboxylate<br>1% alkoxylated C6-C16 alcohol |
| 57 | 0.25 Guerbet alkoxylated carboxylate<br>1% alkoxylated alkylphenol |
| 58 | 0.65% carboxylate<br>0.35% alkoxylated C6-C16 alcohol |
| 59 | 0.325% carboxylate<br>0.925% alkoxylated C6-C16 alcohol |
| 60 | 0.25% olefin sulfonate<br>1.0% alkoxylated C6-C16 alcohol |
| 61 | 0.15% olefin sulfonate<br>0.2% Guerbet alkoxylated carboxylate<br>0.92% carboxylate |
| 62 | 0.65% carboxylate<br>0.35% second carboxylate |
| 63 | 0.65% carboxylate<br>0.35% alkoxylated C6-C16 alcohol<br>1% olefin sulfonate |
| 64 | 1% alkoxylated alcohol<br>1% olefin sulfonate |
| 65 | 0.5% alkoxylated alcohol<br>0.5% olefin sulfonate<br>0.25% carboxylate |
| 66 | 0.6% co-solvent<br>0.6% olefin sulfonate |
| 67 | 0.6% co-solvent<br>0.3% disulfonate<br>0.3% olefin sulfonate |
| 68 | 0.6% Guerbet alkoxylated carboxylate<br>0.6% disulfonate |
| 69 | 0.6% co-solvent<br>0.4% disulfonate<br>0.2% olefin sulfonate |
| 70 | 0.5% alkoxylated C6-C16 alcohol<br>0.4% disulfonate<br>0.3% olefin sulfonate |
| 71 | 1% alkoxylated C6-C16 alcohol |
| 72 | 0.9% alkoxylated C6-C16 alcohol<br>0.6% disulfonate |
| 73 | 0.4% alkoxylated C6-C16 alcohol<br>0.35% disulfonate<br>0.25% olefin sulfonate<br>0.5% co-solvent |
| 74 | 0.25% Guerbet alkoxylated carboxylate<br>0.5% alkoxylated C6-C16 alcohol<br>0.35% disulfonate<br>0.15% olefin sulfonate<br>0.35% co-solvent |
| 75 | 0.25% Guerbet alkoxylated carboxylate<br>0.25% alkoxylated C6-C16 alcohol<br>0.25% olefin sulfonate<br>0.25% co-solvent |
| 76 | 0.25% Guerbet alkoxylated carboxylate<br>0.25% alkoxylated C6-C16 alcohol<br>0.25% olefin sulfonate<br>0.25% alkoxylated alcohol |
| 77 | 0.25% Guerbet alkoxylated carboxylate<br>0.35% olefin sulfonate<br>0.5% alkoxylated alcohol |
| 78 | 0.25% Guerbet alkoxylated carboxylate<br>0.25% alkoxylated C6-C16 alcohol<br>0.15% olefin sulfonate<br>0.1% disulfonate<br>0.25% co-solvent |
| 79 | 0.25% Guerbet alkoxylated carboxylate<br>0.25% alkoxylated C6-C16 alcohol<br>0.25% olefin sulfonate<br>0.25% glycosides or glucosides<br>0.25% co-solvent<br>0.15% disulfonate |
| 80 | 0.25% Guerbet alkoxylated carboxylate<br>0.25% olefin sulfonate<br>0.5% glycosides or glucosides<br>0.25% co-solvent |
| 81 | 0.15% alkoxylated C12-C22 alcohol |
| 82 | 0.075% alkoxylated C12-C22 alcohol<br>0.075% disulfonate |
| 83 | 0.075% alkoxylated C12-C22 alcohol<br>0.075% disulfonate |
| 84 | 0.075% alkoxylated C12-C22 alcohol<br>0.075% alkoxylated C6-C16 Guerbet alcohol |
| 85 | 0.15% alkoxylated C6-C16 Guerbet alcohol |
| 86 | 0.075% alkoxylated C6-C16 Guerbet alcohol<br>0.075% disulfonate |
| 87 | 0.075% alkoxylated C6-C16 Guerbet alcohol<br>0.075% disulfonate<br>0.05% co-solvent |
| 88 | 0.1% alkoxylated C6-C16 alcohol<br>0.05% disulfonate |
| 89 | 1% alkoxylated C6-C16 alcohol<br>0.5% disulfonate |
| 90 | 0.075% alkoxylated C6-C16 Guerbet alcohol<br>0.075% disulfonate |
| 91 | 0.075% alkoxylated C6-C16 Guerbet alcohol<br>0.125% disulfonate |
| 92 | 0.075% alkoxylated C12-C22 alcohol<br>0.125% disulfonate |
| 93 | 0.075% alkoxylated C12-C22 alcohol<br>0.075% disulfonate |
| 94 | 0.075% alkoxylated C6-C16 Guerbet alcohol<br>0.075% disulfonate |
| 95 | 0.1% alkoxylated C6-C16 Guerbet alcohol<br>0.05% disulfonate |
| 96 | 0.075% alkoxylated C6-C16 Guerbet alcohol<br>0.075% disulfonate |
| 97 | 0.075% alkoxylated C6-C16 alcohol<br>0.075% disulfonate |
| 98 | 0.075% alkoxylated C6-C16 Guerbet alcohol<br>0.075% disulfonate |
| 99 | 0.1% alkoxylated C6-C16 alcohol<br>0.05% disulfonate |
| 100 | 0.09% alkoxylated C6-C16 alcohol<br>0.06% disulfonate |
| 101 | 0.1% alkoxylated C6-C16 alcohol<br>0.1% disulfonate<br>0.1% Guerbet alkoxylated carboxylate |
| 102 | 0.1% alkoxylated C6-C16 alcohol<br>0.1% disulfonate |
| 103 | 0.65% Guerbet alkoxylated carboxylate<br>0.35% olefin sulfonate<br>0.33% alkoxylated alkylphenol<br>0.5% co-solvent<br>0.25% second co-solvent |
| 104 | 0.075% alkoxylated C6-C16 alcohol<br>0.075% benzenesulfonic acid, decyl(sulfophenoxy)-disodium salt |
| 105 | 0.15% alkoxylated C6-C16 alcohol<br>0.05% benzenesulfonic acid, decyl(sulfophenoxy)-disodium salt |
| 106 | 0.05% alkoxylated alkylphenol<br>0.05% disulfonate<br>0.05% alkoxylated C6-C16 alcohol |
| 107 | 0.05% alkoxylated C6-C16 alcohol mixture<br>0.1% disulfonate |
| 108 | 0.1% alkoxylated C6-C16 alcohol mixture<br>0.1% disulfonate |
| 109 | 0.05% alkoxylated alkylphenol<br>0.1% disulfonate<br>0.05% alkoxylated C6-C16 alcohol |

| Example | Surfactants and Co-Solvents in Aqueous Composition (in weight percent) |
|---|---|
| 110 | 0.05% alkoxylated alkylphenol<br>0.05% disulfonate<br>0.05% alkoxylated C6-C16 alcohol |
| 111 | 0.9% Guerbet alkoxylated carboxylate<br>0.9% alkoxylated C6-C16 alcohol<br>1.2% olefin sulfonate<br>0.225% co-solvent |
| 112 | 1% alkoxylated C6-C16 alcohol<br>1% olefin sulfonate |
| 113 | 1% alkoxylated C6-C16 alcohol<br>0.75% olefin sulfonate<br>0.5% disulfonate |
| 114 | 1% alkoxylated C6-C16 alcohol<br>0.75% olefin sulfonate<br>0.3% disulfonate |
| 115 | 0.5% alkoxylated C6-C16 alcohol<br>0.85% olefin sulfonate<br>0.15% disulfonate |
| 116 | 0.9% Guerbet alkoxylated carboxylate<br>0.9% alkoxylated C6-C16 alcohol<br>1.2% olefin sulfonate<br>0.225% co-solvent |
| 117 | 1% alkoxylated C6-C16 alcohol<br>0.75% olefin sulfonate<br>0.3% disulfonate |
| 118 | 0.9% Guerbet alkoxylated carboxylate<br>0.9% alkoxylated C6-C16 alcohol<br>1.2% olefin sulfonate<br>0.225% co-solvent |
| 119 | 0.5% Guerbet alkoxylated carboxylate<br>0.5% alkoxylated C6-C16 alcohol<br>0.15% olefin sulfonate<br>0.35% disulfonate<br>0.5% alkoxylated alkylphenol<br>0.13% co-solvent |
| 120 | 0.5% Guerbet alkoxylated carboxylate<br>0.5% alkoxylated C6-C16 alcohol<br>0.5% disulfonate<br>0.5% alkoxylated alkylphenol<br>0.13% co-solvent |
| 121 | 0.5% Guerbet alkoxylated carboxylate<br>0.5% alkoxylated C6-C16 alcohol<br>0.5% olefin sulfonate<br>0.5% disulfonate |
| 122 | 0.5% C6-C16 alcohol alkoxylated carboxylate<br>0.25% alkoxylated C6-C16 alcohol<br>0.15% olefin sulfonate<br>0.35% disulfonate |
| 123 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent |
| 124 | 0.5% C6-C16 alcohol alkoxylated carboxylate<br>0.25% alkoxylated C6-C16 alcohol<br>0.15% olefin sulfonate<br>0.35% disulfonate |
| 125 | 0.5% Guerbet alkoxylated carboxylate<br>0.5% alkoxylated C6-C16 alcohol<br>0.15% olefin sulfonate<br>0.35% disulfonate<br>0.25% cetyl betaine |
| 126 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>0.02% cetyl Betaine |
| 127 | 0.5% olefin sulfonate<br>0.5% alkyl aryl sulfonate<br>0.5% disulfonate |
| 128 | 0.5% olefin sulfonate<br>0.5% alkyl aryl sulfonate<br>0.5% disulfonate<br>2% co-solvent |
| 129 | 0.5% olefin sulfonate<br>0.5% alkyl aryl sulfonate<br>0.5% disulfonate<br>2% co-solvent |
| 130 | 0.5% olefin sulfonate<br>0.5% alkyl aryl sulfonate<br>0.5% disulfonate<br>0.5% alkoxylated C6-C16 alcohol<br>0.5% co-solvent |
| 131 | 0.5% olefin sulfonate<br>0.5% alkyl aryl sulfonate<br>0.5% disulfonate<br>0.5% alkoxylated alkylphenol |
| 132 | 0.5% olefin sulfonate<br>0.5% alkyl aryl sulfonate<br>0.5% alkoxylated alkylphenol |

Polymers

In some embodiments, the aqueous compositions can further include a polymer, such as a viscosity enhancing water-soluble polymer. In some embodiments, the water-soluble polymer may be a biopolymer such as xanthan gum or scleroglucan, a synthetic polymer such as polyacryamide, hydrolyzed polyarcrylamide or co-polymers of acrylamide and acrylic acid, 2-acrylamido 2-methyl propane sulfonate or N-vinyl pyrrolidone, a synthetic polymer such as poly-ethylene oxide, or any other high molecular weight polymer soluble in water or brine. In some embodiments, the polymer is polyacrylamide (PAM), partially hydrolyzed polyacryl-amides (HPAM), and copolymers of 2-acrylamido-2-methylpropane sulfonic acid or sodium salt or mixtures thereof, and polyacrylamide (PAM) commonly referred to as AMPS copolymer and mixtures of the copolymers thereof. In one embodiment, the viscosity enhancing water-soluble polymer is polyacrylamide or a co-polymer of polyacrylamide. In one embodiment, the viscosity enhancing water-soluble polymer is a partially (e.g. 20%, 25%, 30%, 35%, 40%, 45%) hydrolyzed anionic polyacrylamide. Molecular weights of the polymers may range from about 10,000 Daltons to about 20,000,000 Daltons. In some embodiments, the viscosity enhancing water-soluble polymer is used in the range of about 100 to about 5000 ppm concentration, such as from about 1000 to 2000 ppm (e.g., in order to match or exceed the reservoir oil viscosity under the reservoir conditions of temperature and pressure). The polymer can be a powder polymer, a liquid polymer, or an emulsion polymer.

Some examples of polymers are discussed in the following: U.S. Pat. No. 9,909,053, U.S. Pat. No. 9,896,617, U.S. Pat. No. 9,902,894, U.S. Pat. No. 9,902,895, U.S. Patent Application Publication No. 2017/0158947, U.S. Patent Application Publication No. 2017/0158948, and U.S. Patent Application Publication No. 2018/0155505, each of which is incorporated by reference in its entirety. More examples of polymers may be found in Dwarakanath et al., "Permeability Reduction Due to use of Liquid Polymers and Development of Remediation Options," SPE 179657, SPE IOR Symposium in Tulsa, 2016, which is incorporated by reference in its entirety.

Additional Components

In some embodiments, the aqueous compositions can further include a co-solvent. Suitable co-solvents include alcohols, such as lower carbon chain alcohols such as isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycol ethers, ethoxylated phenol, or any other common organic co-solvent or combinations of any two or more co-solvents. In one embodiment, the co-solvent can comprise alkyl ethoxylate (C1-C6)-XEO X=1-30-linear or branched. In some embodiments, the co-solvent can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), or any combination thereof.

The aqueous compositions provided herein may include more than one co-solvent. Thus, in embodiments, the aqueous composition includes a plurality of different co-solvents. Where the aqueous composition includes a plurality of different co-solvents, the different co-solvents can be distinguished by their chemical (structural) properties. For example, the aqueous composition may include a first co-solvent, a second co-solvent and a third co-solvent, wherein the first co-solvent is chemically different from the second and the third co-solvent, and the second co-solvent is chemically different from the third co-solvent. In embodiments, the plurality of different co-solvents includes at least two different alcohols (e.g., a $C_1$-$C_6$ alcohol and a $C_1$-$C_4$ alcohol). In embodiments, the aqueous composition includes a $C_1$-$C_6$ alcohol and a $C_1$-$C_4$ alcohol. In embodiments, the plurality of different co-solvents includes at least two different alkoxy alcohols (e.g., a $C_1$-$C_6$ alkoxy alcohol and a $C_1$-$C_4$ alkoxy alcohol). In embodiments, the aqueous composition includes a $C_1$-$C_6$ alkoxy alcohol and a $C_1$-$C_4$ alkoxy alcohol. In embodiments, the plurality of different co-solvents includes at least two co-solvents selected from the group consisting of alcohols, alkyl alkoxy alcohols and phenyl alkoxy alcohols. For example, the plurality of different co-solvents may include an alcohol and an alkyl alkoxy alcohol, an alcohol and a phenyl alkoxy alcohol, or an alkyl alkoxy alcohol and a phenyl alkoxy alcohol. The alkyl alkoxy alcohols or phenyl alkoxy alcohols provided herein have a hydrophobic portion (alkyl or aryl chain), a hydrophilic portion (e.g., an alcohol) and optionally an alkoxy (ethoxylate or propoxylate) portion. Thus, in embodiments, the co-solvent is an alcohol, alkoxy alcohol, glycol ether, glycol or glycerol. Suitable co-solvents are known in the art, and include, for example, co-surfactants described in U.S. Patent Application Publication No. 2013/0281327 which is hereby incorporated herein in its entirety.

The co-solvents can have a concentration within the aqueous composition of at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.5% by weight, at least 3% by weight, at least 3.5% by weight, at least 4% by weight, or at least 4.5% by weight), based on the total weight of the aqueous composition. In some embodiments, the co-solvents can have a concentration within the aqueous composition of 5% by weight or less (e.g., 4.5% by weight or less, 4% by weight or less, 3.5% by weight or less, 3% by weight or less, 2.5% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous composition.

The co-solvents can have a concentration within the aqueous composition ranging from any of the minimum values described above to any of the maximum values described above. For example, in some embodiments, the co-solvents can have a concentration within the aqueous composition of from 0.01% to 5% by weight (e.g., from 0.01% to 2.5% by weight, from 0.05% to 5% by weight, from 0.05% to 2.5% by weight, from 0.05% to 1% by weight, or from 0.05% to 0.5% by weight), based on the total weight of the aqueous composition.

Optionally, the aqueous composition can further comprise additional components for use in oil and gas operations, such as a friction reducer, a gelling agent, a crosslinker, a breaker, a pH adjusting agent, a non-emulsifier agent, an iron control agent, a corrosion inhibitor, a scale inhibitor, a biocide, a clay stabilizing agent, a chelating agent, a proppant, a wettability alteration chemical, or any combination thereof.

In some embodiments, the aqueous composition can further include a gas. For instance, the gas may be combined with the aqueous composition to reduce its mobility by decreasing the liquid flow in the pores of the solid material (e.g., rock). In some embodiments, the gas may be supercritical carbon dioxide, nitrogen, natural gas or mixtures of these and other gases.

Some example aqueous compositions are included in the table below.

| Example | Components of Aqueous Composition (in weight percent) |
|---|---|
| 1 | 0.9% Guerbet alkoxylated carboxylate<br>0.9% alkoxylated C6-C16 alcohol<br>1.2% olefin sulfonate<br>0.225% co-solvent<br>2% sodium tetraborate<br>1% acetic acid |
| 2 | 1% alkoxylated C6-C16 alcohol<br>1% olefin sulfonate<br>2% sodium tetraborate<br>1% acetic acid |

| Example | Components of Aqueous Composition (in weight percent) |
|---|---|
| 3 | 1% alkoxylated C6-C16 alcohol<br>0.75% olefin sulfonate<br>0.5% disulfonate<br>2% sodium tetraborate<br>1% acetic acid |
| 4 | 1% alkoxylated C6-C16 alcohol<br>0.75% olefin sulfonate<br>0.3% disulfonate<br>2% sodium tetraborate<br>1% acetic acid |
| 5 | 0.5% alkoxylated C6-C16 alcohol<br>0.85% olefin sulfonate<br>0.15% disulfonate<br>2% sodium tetraborate<br>1% acetic acid |
| 6 | 0.9% Guerbet alkoxylated carboxylate<br>0.9% alkoxylated C6-C16 alcohol<br>1.2% olefin sulfonate<br>0.225% co-solvent<br>2% sodium tetraborate<br>1% citric acid |
| 7 | 1% alkoxylated C6-C16 alcohol<br>0.75% olefin sulfonate<br>0.3% disulfonate<br>2% sodium tetraborate<br>1% citric acid |
| 8 | 0.9% Guerbet alkoxylated carboxylate<br>0.9% alkoxylated C6-C16 alcohol<br>1.2% olefin sulfonate<br>0.225% co-solvent<br>2% sodium tetraborate<br>1.1% citric acid |
| 9 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>2% sodium tetraborate<br>1% acetic acid |
| 10 | 0.5% C6-C16 alcohol alkoxylated carboxylate<br>0.25% alkoxylated C6-C16 alcohol<br>0.15% olefin sulfonate<br>0.35% disulfonate<br>2% sodium tetraborate<br>1% acetic acid |
| 11 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>0.02% cetyl betaine<br>2% sodium tetraborate<br>1% acetic acid |

Methods

The aqueous compositions described herein can be used in a variety of oil and gas operations, including an EOR operation (e.g., an improved oil recovery (IOR) operation, a polymer (P) flooding operation, a surfactant (S) flooding operation, an alkaline-polymer (AP) flooding operation, an alkaline-surfactant (AS) flooding operation, a surfactant-polymer (SP) flooding operation, a alkaline-surfactant-polymer (ASP) flooding operation, a conformance control operation, or any combination thereof). Moreover, the aqueous compositions described herein can be used in a variety of oil and gas operations, including hydraulic fracturing operations. In one embodiment, the aqueous compositions can be used as an injection fluid. In another embodiment, the aqueous compositions can be included in an injection fluid. In another embodiment, the aqueous compositions can be used as a hydraulic fracturing fluid. In another embodiment, the aqueous compositions can be included in a hydraulic fracturing fluid. In short, in certain embodiments, the aqueous compositions described herein can be used in hydrocarbon recovery.

Methods for improving the recovery of hydrocarbons from a subterranean formation containing the hydrocarbons therewithin can comprise injecting an aqueous composition comprising (i) a borate-acid buffer, (ii) a surfactant package, a water-soluble polymer, or any combination thereof, and (iii) water into the subterranean formation through a wellbore in fluid communication with the subterranean formation. The borate-acid buffer can exhibit a capacity to buffer at a pH of from 6.0 to 8.5 (e.g., a pH of from 6.5 to 7.5). In some cases, the borate-acid buffer can exhibit a capacity to buffer at a pH below the point of zero charge of the formation.

The subterranean formation can be a subsea reservoir and/or the subsurface reservoir. In some embodiments, the subterranean formation can have a permeability of from 26 millidarcy to 40,000 millidarcy.

In some embodiments, there is no need to drill the wellbore. In some embodiments, the wellbore has been drilled and completed, and hydrocarbon production has occurred from the wellbore. In other embodiments, methods can optionally include one or more of drilling the wellbore, completing the wellbore, and producing hydrocarbons from the wellbore (prior to injection of the aqueous composition).

In some embodiments, the subterranean formation can have a temperature of at least 75° F. (e.g., at least 80° F., at least 85° F., at least 90° F., at least 95° F., at least 100° F., at least 105° F., at least 110° F., at least 115° F., at least 120° F., at least 125° F., at least 130° F., at least 135° F., at least 140° F., at least 145° F., at least 150° F., at least 155° F., at least 160° F., at least 165° F., at least 170° F., at least 175° F., at least 180° F., at least 190° F., at least 200° F., at least 205° F., at least 210° F., at least 215° F., at least 220° F., at least 225° F., at least 230° F., at least 235° F., at least 240° F., at least 245° F., at least 250° F., at least 255° F., at least 260° F., at least 265° F., at least 270° F., at least 275° F., at least 280° F., at least 285° F., at least 290° F., at least 295° F., at least 300° F., at least 305° F., at least 310° F., at least 315° F., at least 320° F., at least 325° F., at least 330° F., at least 335° F., at least 340° F., or at least 345° F.). In some embodiments, the subterranean formation can have a temperature of 350° F. or less (e.g., 345° F. or less, 340° F. or less, 335° F. or less, 330° F. or less, 325° F. or less, 320° F. or less, 315° F. or less, 310° F. or less, 305° F. or less, 300° F. or less, 295° F. or less, 290° F. or less, 285° F. or less, 280° F. or less, 275° F. or less, 270° F. or less, 265° F. or less, 260° F. or less, 255° F. or less, 250° F. or less, 245° F. or less, 240° F. or less, 235° F. or less, 230° F. or less, 225° F. or less, 220° F. or less, 215° F. or less, 210° F. or less, 205° F. or less, 200° F. or less, 195° F. or less, 190° F. or less, 185° F. or less, 180° F. or less, 175° F. or less, 170° F. or less, 165° F. or less, 160° F. or less, 155° F. or less, 150° F. or less, 145° F. or less, 140° F. or less, 135° F. or less, 130° F. or less, 125° F. or less, 120° F. or less, 115° F. or less, 110° F. or less, 105° F. or less, 100° F. or less, 95° F. or less, 90° F. or less, 85° F. or less, or 80° F. or less).

The subterranean formation can have a temperature ranging from any of the minimum values described above to any of the maximum values described above. For example, in some embodiments, the subterranean formation can have a temperature of from 75° F. to 350° F. (approximately 24° C. to 176° C.), from 150° F. to 250° F. (approximately 66° C. to 121° C.), from 110° F. to 350° F. (approximately 43° C.

to 176° C.), from 110° F. to 150° F. (approximately 43° C. to 66° C.), from 150° F. to 200° F. (approximately 66° C. to 93° C.), from 200° F. to 250° F. (approximately 93° C. to 121° C.), from 250° F. to 300° F. (approximately 121° C. to 149° C.), from 300° F. to 350° F. (approximately 149° C. to 176° C.), from 110° F. to 240° F. (approximately 43° C. to 116° C.), or from 240° F. to 350° F. (approximately 116° C. to 176° C.).

In some embodiments, the salinity of the subterranean formation can be at least 5,000 ppm TDS (e.g., at least 25,000 ppm TDS, at least 50,000 ppm TDS, at least 75,000 ppm TDS, at least 100,000 ppm TDS, at least 125,000 ppm TDS, at least 150,000 ppm TDS, at least 175,000 ppm TDS, at least 200,000 ppm TDS, at least 225,000 ppm TDS, at least 250,000 ppm TDS, or at least 275,000 ppm TDS). In some embodiments, the salinity of the subterranean formation can be 300,000 ppm TDS or less (e.g., 275,000 ppm TDS or less, 250,000 ppm TDS or less, 225,000 ppm TDS or less, 200,000 ppm TDS or less, 175,000 ppm TDS or less, 150,000 ppm TDS or less, 125,000 ppm TDS or less, 100,000 ppm TDS or less, 75,000 ppm TDS or less, 50,000 ppm TDS or less, or 25,000 ppm TDS or less).

The salinity of subterranean formation can range from any of the minimum values described above to any of the maximum values described above. For example, in some embodiments, the salinity of the subterranean formation can be from 5,000 ppm TDS to 300,000 ppm TDS (e.g., from 100,000 ppm to 300,000 ppm TDS).

In some embodiments, the subterranean formation can be oil-wet. In some embodiments, the subterranean formation can be water-wet. In some embodiments, the subterranean formation can be mixed-wet (heterogeneous wet). In some embodiments, the subterranean formation can be intermediate-wet.

The wellbore in the second step can be an injection wellbore, and the method can further comprise providing a production wellbore in fluid communication with the subterranean formation and spaced-apart from the injection wellbore. In these embodiments, injection of the aqueous composition can increase the flow of hydrocarbons to the production wellbore.

In some embodiments, methods of hydrocarbon recovery can further include a recycling step. For example, in some embodiments, methods of hydrocarbon recovery can further comprise producing production fluid from the production well, the production fluid including at least a portion of the aqueous composition; and separating the portion of the aqueous composition from the production fluid. The portion of the aqueous composition can be injected into at least one wellbore (e.g., an injection well, the same wellbore discussed in the second step or a different wellbore, etc.).

The wellbore in the second step can also be a wellbore for hydraulic fracturing that is in fluid communication with the subsurface subterranean.

In some embodiments, the borate-acid buffer can be combined with other components (e.g., a surfactant package, a polymer, etc.) and water in a continuous process to form the aqueous composition (which is subsequently injected). In other examples, the borate-acid buffer and one or more additional components (e.g., a surfactant package, a polymer, etc.) can be present in a single concentrated package with can be diluted with water in a continuous process to form the aqueous composition (which is subsequently injected).

In certain embodiments, the aqueous compositions described herein can be used treatment operations in an unconventional formation.

In some embodiments, the aqueous composition can be used in a completion and/or fracturing operation. For example, the aqueous composition can be injected into an unconventional subterranean formation to form and/or extend fractures within the formation. In certain embodiments, the fracturing operation can comprise combining a surfactant package and a borate-acid buffer described herein with an aqueous-based injection fluid to form an aqueous composition; and injecting the aqueous composition through a wellbore and into the unconventional subterranean formation at a sufficient pressure and at a sufficient rate to fracture the unconventional subterranean formation. In some embodiments, the wellbore is a hydraulic fracturing wellbore associated with a hydraulic fracturing well, for example, that may have a substantially vertical portion only, or a substantially vertical portion and a substantially horizontal portion below the substantially vertical portion. In some embodiments, the fracturing operation can be performed in a new well (e.g., a well that has not been previously fractured). In other embodiments, the aqueous composition can be used in a fracturing operation in an existing well (e.g., in a refracturing operation). In some examples, the borate-acid buffer can exhibit a capacity to buffer at a pH of from 6.0 to 8.5 (e.g., a pH of from 6.5 to 7.5). In some examples, the borate-acid buffer can exhibit a capacity to buffer at a pH below the point of zero charge of the formation.

In some embodiments, the method can comprise performing a fracturing operation on a region of the unconventional subterranean formation proximate to a new wellbore. In some embodiments, the method can comprise performing a fracturing operation on a region of the unconventional subterranean formation proximate to an existing wellbore. In some embodiments, the method can comprise performing a refracturing operation on a previously fractured region of the unconventional subterranean formation proximate to a new wellbore. In some embodiments, the method can comprise performing a refracturing operation on a previously fractured region of the unconventional subterranean formation proximate to an existing wellbore. In some embodiments, the method can comprise performing a fracturing operation on a naturally fractured region of the unconventional subterranean formation proximate to a new wellbore (e.g., an infill well). In some embodiments, the method can comprise performing a fracturing operation on a naturally fractured region of the unconventional subterranean formation proximate to an existing wellbore.

In cases where the fracturing method comprises a refracturing methods, the previously fractured region of the unconventional reservoir can have been fractured by any suitable type of fracturing operation. For example, the fracturing operation may include hydraulic fracturing, fracturing using electrodes such as described in U.S. Pat. No. 9,890,627, U.S. Pat. No. 9,840,898, U.S. Patent Publication No. 2018/0202273, or fracturing with any other available equipment or methodology. In some embodiments, the fracturing operation can further comprise adding a tracer to the aqueous composition prior to introducing or along with the aqueous composition or through the wellbore into the subterranean formation; recovering the tracer from the fluids produced from the unconventional subterranean formation through the wellbore, fluids recovered from a different wellbore in fluid communication with the unconventional subterranean formation, or any combination thereof; and comparing the quantity of tracer recovered from the fluids produced to the quantity of tracer introduced. For example, in the context of a new well, a tracer can be added along with (as part of) the aqueous composition. In the context of an existing well, a tracer can be added prior to introduction of the aqueous composition, along with (as part of) the aqueous composition, or any combination thereof. The tracer can comprise a proppant tracer, an oil tracer, a water tracer, or any combination thereof. Example tracers are known in the art, and described, for example, in U.S. Pat. No. 9,914,872 and Ashish Kumar et al., Diagnosing Fracture-Wellbore Connectivity Using Chemical Tracer Flowback Data, URTeC 2902023, Jul. 23-25, 2018, page 1-10, Texas, USA.

The aqueous compositions described herein can be used at varying points throughout a fracturing operation. For example, the aqueous compositions can be used as an injection fluid during the first, middle or last part of the fracturing process, or throughout the entire fracturing process. In some embodiments, the fracturing process can include a plurality of stages and/or sub-stages. For example, the fracturing process can involve sequential injection of fluids in different stages, with each of the stages employing a different aqueous-based injection fluid system (e.g., with varying properties such as viscosity, chemical composition, etc.). Example fracturing processes of this type are described, for example, in U.S. Patent Application Publication Nos. 2009/0044945 and 2015/0083420, each of which is hereby incorporated herein by reference in its entirely. In these embodiments, the aqueous composition can be used as an injection fluid (optionally with additional components) during any or all of the stages and/or sub-stages.

In some embodiments, the aqueous composition can be used as part of a reservoir stimulation operation. In some embodiments, the stimulation operations can be performed on an unconventional subterranean formation. For example, in some embodiments, the stimulation operation can be performed on an unconventional subterranean formation (e.g., an unconventional subterranean formation having a permeability of from $1.0 \times 10^{-6}$ millidarcy to 25.9 millidarcy). In other embodiments, the stimulation can be performed on a conventional subterranean formation (e.g., a subterranean formation having a permeability of from 26 millidarcy to 40,000 millidarcy). In some stimulation examples, the borate-acid buffer can exhibit a capacity to buffer at a pH of from 6.0 to 8.5 (e.g., a pH of from 6.5 to 7.5). In some examples, the borate-acid buffer can exhibit a capacity to buffer at a pH below the point of zero charge of the formation.

In some stimulation operations, the aqueous composition can be injected to alter the wettability of existing fractures within the formation (without further fracturing the formation significantly by either forming new fractures within the formation and/or extending the existing fractures within the formation). In such stimulation operations, no proppant is used, and fluid injection generally occurs at a lower pressure.

In some cases, the existing fractures can be naturally occurring fractures present within a formation. For example, in some embodiments, the formation can comprise naturally fractured carbonate or naturally fractured sandstone. The presence or absence of naturally occurring fractures within a subterranean formation can be assessed using standard methods known in the art, including seismic surveys, geology, outcrops, cores, logging, reservoir characterization including preparing grids, etc.

In some embodiments, methods for stimulating an unconventional subterranean formation with a fluid can comprise introducing an aqueous composition described herein through a wellbore into the unconventional subterranean formation; allowing the aqueous composition to imbibe into a rock matrix of the unconventional subterranean formation for a period of time; and producing fluids from the unconventional subterranean formation through the wellbore.

In these methods, the same wellbore can be used for both introducing the aqueous composition and producing fluids from the unconventional subterranean formation. In some embodiments, introduction of the aqueous composition can increase the production of hydrocarbons from the same wellbore, from a different wellbore in fluid communication with the unconventional subterranean formation, or any combination thereof.

In some embodiments, the stimulation operation can further comprise preparing the aqueous composition. For example, in some embodiments, the stimulation operation can further comprise combining a borate-acid buffer and a surfactant package described herein with water to form the aqueous composition. In some embodiments when used in a stimulation operation, the aqueous composition can have a total surfactant concentration of from 0.2% to 5% by weight, based on the total weight of the low particle size injection fluid.

In some embodiments, introducing the aqueous composition described herein through a wellbore into the unconventional subterranean formation can comprise injecting the aqueous composition through the wellbore and into the unconventional subterranean formation at a sufficient pressure and at a sufficient rate to stimulate hydrocarbon production from naturally occurring fractures in the unconventional subterranean formation.

The aqueous composition can be allowed to imbibe into the rock matrix of the unconventional subterranean formation for varying periods of time depending on the nature of the rock matrix. The imbibing can occur during the introducing step, between the introducing and producing step, or any combination thereof. In some examples, the aqueous composition can be allowed to imbibe into the rock matrix of the unconventional subterranean formation for at least one day (e.g., at least two days, at least three days, at least four days, at least five days, at least six days, at least one week, at least two weeks, at least three weeks, at least one month, at least two months, at least three months, at least four months, or at least five months). In some examples, the aqueous composition can be allowed to imbibe into the rock matrix of the unconventional subterranean formation for six months or less (e.g., five months or less, four months or less, three months or less, two months or less, one month or less, three weeks or less, two weeks or less, one week or less, six days or less, five days or less, four days or less, three days or less, or two days or less).

The aqueous composition can be allowed to imbibe into the rock matrix of the unconventional subterranean formation for a period of time ranging from any of the minimum values described above to any of the maximum values described above. For example, the aqueous composition can be allowed to imbibe into the rock matrix of the unconventional subterranean formation for from one day to six months. In one example, the wellbore can be a new wellbore; and the aqueous composition can be allowed to imbibe into the rock matrix of the unconventional subterranean formation for from two weeks to one month. In another example, the wellbore can be a wellbore proximate to a previously fractured region of the unconventional subterranean formation; and the aqueous composition can be allowed to imbibe into the rock matrix of the unconventional subterranean formation for from one day to two weeks.

In some embodiments, the wellbore used in the stimulation operation may have a substantially vertical portion only, or a substantially vertical portion and a substantially horizontal portion below the substantially vertical portion.

In some embodiments, the stimulation methods described herein can comprise stimulating a naturally fractured region of the unconventional subterranean formation proximate to a new wellbore (e.g., an infill well). In some embodiments, the stimulation methods described herein can comprise stimulating a naturally fractured region of the unconventional subterranean formation proximate to an existing wellbore.

In some embodiments, the stimulation methods described herein can comprise stimulating a previously fractured or previously refractured region of the unconventional subterranean formation proximate to a new wellbore (e.g., an infill well). In some embodiments, the stimulation methods described herein can comprise stimulating a previously fractured or previously refractured region of the unconventional subterranean formation proximate to an existing wellbore.

The previous fracturing operation may include hydraulic fracturing, fracturing using electrodes such as described in U.S. Pat. No. 9,890,627, U.S. Pat. No. 9,840,898, U.S. Patent Publication No. 2018/0202273, or fracturing with any other available equipment or methodology. The previous refracturing operation may include hydraulic fracturing, fracturing using electrodes such as described in U.S. Pat. No. 9,890,627, U.S. Pat. No. 9,840,898, U.S. Patent Publication No. 2018/0202273, or refracturing with any other available equipment or methodology. In some embodiments, after a formation that has fractures, such as naturally occurring factures, fractures from a fracture operation, fractures from a refracturing operation, or any combination thereof, the fractured formation may be stimulated. For example, a formation may be stimulated after a sufficient amount of time has passed since the fracturing operation with electrodes or refracturing operation with electrodes occurred in that formation so that the electrical pulses utilized to fracture or refracture that formation do not substantially affect the aqueous composition.

In some embodiments, the stimulation operation can further comprise adding a tracer to the aqueous composition prior to introducing or along with the aqueous composition or through the wellbore into the subterranean formation; recovering the tracer from the fluids produced from the unconventional subterranean formation through the wellbore, fluids recovered from a different wellbore in fluid communication with the unconventional subterranean formation, or any combination thereof; and comparing the quantity of tracer recovered from the fluids produced to the quantity of tracer introduced.

In another aspect, a method of displacing a hydrocarbon material in contact with a solid material is provided. The method includes contacting a hydrocarbon material with an aqueous composition as described herein, wherein the hydrocarbon material is in contact with a solid material. The hydrocarbon material is allowed to separate from the solid material thereby displacing the hydrocarbon material in contact with the solid material. In some examples, the borate-acid buffer can exhibit a capacity to buffer at a pH of from 6.0 to 8.5 (e.g., a pH of from 6.5 to 7.5). In some examples, the borate-acid buffer can exhibit a capacity to buffer at a pH below the point of zero charge of the solid material.

In other embodiments, the hydrocarbon material is unrefined petroleum (e.g., in a petroleum reservoir). In some further embodiments, the unrefined petroleum is a light oil. A "light oil" as provided herein is an unrefined petroleum with an API gravity greater than 30. In some embodiments, the API gravity of the unrefined petroleum is greater than 30. In other embodiments, the API gravity of the unrefined petroleum is greater than 40. In some embodiments, the API gravity of the unrefined petroleum is greater than 50. In other embodiments, the API gravity of the unrefined petroleum is greater than 60. In some embodiments, the API gravity of the unrefined petroleum is greater than 70. In other embodiments, the API gravity of the unrefined petroleum is greater than 80. In some embodiments, the API gravity of the unrefined petroleum is greater than 90. In other embodiments, the API gravity of the unrefined petroleum is greater than 100. In some other embodiments, the API gravity of the unrefined petroleum is between 30 and 100.

In other embodiments, the hydrocarbons or unrefined petroleum can comprise crude having an $H_2S$ concentration of at least 0.5%, a $CO_2$ concentration of 0.3%, or any combination thereof.

In some embodiments, the hydrocarbons or unrefined petroleum can comprise crude having an $H_2S$ concentration of at least 0.5% (e.g., at least 1%, at least 1.5%, at least 2%, at least 2.5%, at least 3%, at least 3.5%, at least 4%, or at least 4.5%). In some embodiments, the hydrocarbons or unrefined petroleum can comprise crude having an $H_2S$ concentration of 5% or less (4.5% or less, 4% or less, 3.5% or less, 3% or less, 2.5% or less, 2% or less, 1.5% or less, or 1% or less).

The hydrocarbons or unrefined petroleum can comprise crude having an $H_2S$ concentration ranging from any of the minimum values described above. For example, in some embodiments, the hydrocarbons or unrefined petroleum can comprise crude having an $H_2S$ concentration of from 0.5% to 5% (e.g., from 0.5% to 2.5%).

In some embodiments, the hydrocarbons or unrefined petroleum can comprise crude having a $CO_2$ concentration of at least 0.3% (e.g., at least 0.5%, at least 1%, at least 1.5%, at least 2%, at least 2.5%, at least 3%, at least 3.5%, at least 4%, or at least 4.5%). In some embodiments, the hydrocarbons or unrefined petroleum can comprise crude having a $CO_2$ concentration of 5% or less (4.5% or less, 4% or less, 3.5% or less, 3% or less, 2.5% or less, 2% or less, 1.5% or less, 1% or less, or 0.5% or less).

The hydrocarbons or unrefined petroleum can comprise crude having a $CO_2$ concentration ranging from any of the minimum values described above. For example, in some embodiments, the hydrocarbons or unrefined petroleum can comprise crude having a $CO_2$ concentration of from 0.3% to 5% (e.g., from 0.3% to 2.5%).

The solid material may be a natural solid material (i.e., a solid found in nature such as rock). The natural solid material may be found in a petroleum reservoir. In some embodiments, the method is an enhanced oil recovery method. Enhanced oil recovery methods are well known in the art. A general treatise on enhanced oil recovery methods is Basic Concepts in Enhanced Oil Recovery Processes edited by M. Baviere (published for SCI by Elsevier Applied Science, London and New York, 1991). For example, in an enhanced oil recovery method, the displacing of the unrefined petroleum in contact with the solid material is accomplished by contacting the unrefined with a compound provided herein, wherein the unrefined petroleum is in contact with the solid material. The unrefined petroleum may be in an oil reservoir. The compound or composition provided herein can be pumped into the reservoir in accordance with known enhanced oil recovery parameters. The compound can be pumped into the reservoir as part of the aqueous compositions provided herein and, upon contacting the unrefined petroleum, form an emulsion composition provided herein.

In some embodiments, the natural solid material can be rock or regolith. The natural solid material can be a geological formation such as clastics or carbonates. The natural solid material can be either consolidated or unconsolidated material or mixtures thereof. The hydrocarbon material may be trapped or confined by "bedrock" above or below the natural solid material. The hydrocarbon material may be found in fractured bedrock or porous natural solid material. In other embodiments, the regolith is soil. In other embodiments, the solid material can be, for example, oil sand or tar sands.

In other embodiments, the solid material can comprise equipment associated with an oil and gas operation. For example, the solid material can comprise surface processing equipment, downhole equipment, pipelines and associated equipment, pumps, and other equipment which contacts hydrocarbons during the course of an oil and gas operation.

By way of non-limiting illustration, examples of certain embodiments of the present disclosure are given below.

EXAMPLES

The examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, percents associated with components of compositions are percents by weight, based on the total weight of the composition including the components, temperature is in ° C. or is at ambient temperature, and pressure is at or near atmospheric.

Example 1: Contact Angle and Phase Behavior with Sodium Tetraborate in High Hardness Brine There are known complications associated with the use of high hardness aqueous fluids in oil and gas operations. Borate-acid buffers provide a means to address many of the complications associated with the use of high hardness fluids.

Divalent Cation Sequestration.

Divalent cations in injection and formation water inhibit surfactant performance. Typical sulfonated surfactants such as IOS and AOS precipitate out in the presence of hardness and cannot be used. One trick frequently used is to add ethoxylated sulfates or sulfonates to the olefin sulfonates to allow mixed surfactant formulations to tolerate divalent cations. However, this approach is expensive. Another alternative is to soften injection brine by removing the divalent cations. The third approach is to use a chelating agent such as EDTA. EDTA is a common chelating agent that has been used in laboratory studies. However, it is too expensive to use in the field applications. Borax is used in the detergent industry to chelate calcium but have not been applied in the petroleum industry due to the fact high pH of borate derivatives (>8.5) causes precipitation with Ca and Mg.

Surfactant Stability Improvement.

Surfactants, especially alcohol ether carboxylates and alcohol ether sulfates can degrade at low pH conditions (<=6.5) typically observed during long-term storage. Hence the alcohol ether sulfate and carboxylates typically come with a shelf life. Typical alcohol ether carboxylates and sulfates are buffered with alkali to high pH during manufacturing (>10) to provide a longer shelf life. However, if the injection brines contain high divalent ion concentrations (Ca and Mg), there is potential for precipitation.

Wettability Alteration.

Wettability alteration of oil-wet reservoirs to water-wet can speed up the rate of oil recovery and increase ultimate oil recovery from oil-wet reservoirs. In fractured carbonate and shale reservoirs, which are typically oil-wet, change in wettability can greatly improve oil recovery. Generally, two methods of wettability alteration exist. Surfactants can be injected to change wettability or a different salinity brine with altered divalent/monovalent ion ratios can be injected to change wettability (Brine Chemistry Optimization). Traditional alkali, such as sodium carbonate has also been known to change wettability of oil-wet rocks to water-wet but such alkali cannot be used in presence of Ca and Mg due to precipitations caused by high pH.

Neutron log Signal Improvement.

Often, logging equipment are used in wells to determine saturation of fluids near wellbore. A commonly used logging equipment is a neutron log. However, in low porosity reservoirs, the signal difference between crude oil and water is near the noise of the equipment and cannot be accurately distinguished. It is necessary in such situations to incorporate a neutron absorbing material into the injected fluid to improve signal difference between crude oil and water. Boron is a neutron absorbing material. Most soluble borons come in borate forms and should not be used in hard brine due to Mg and Ca precipitations caused by high pH.

Methods

Formulation A was prepared in in a high hardness brine (50,000 ppm TDS, with approximately 12,000 ppm $Mg^{2+}$ and $Ca^{2+}$), brine containing 0.5% sodium tetraborate and 0.275% citric acid, and brine containing 2% sodium tetraborate and 1% acetic acid. The pH of the surfactant stock was adjusted to approximately pH 7.5.

TABLE 1

| Components of Example Formulations. | |
|---|---|
| Formulation A | 0.65% Guerbet alkoxylated carboxylate |
| | 0.35% olefin sulfonate |
| | 0.33% alkoxylated alkylphenol |
| | 0.5% co-solvent |
| | 0.25% second co-solvent |
| Formulation B | 0.9% Guerbet alkoxylated carboxylate |
| | 1.2% olefin sulfonate |
| | 0.9% alkoxylated C12-C22 alcohol |

The phase behavior of all three formulations was evaluated. All of the salinities were recorded based on brine salinity only. The sodium tetraborate and acids were not included for purposes of the salinity calculation. In this example, values for the optimum salinity and aqueous stability remained largely unchanged (±5%) upon addition of the borate-acid buffer. In all cases, the aqueous stability was greater than the optimum salinity.

Formulation B was prepared in in a high hardness brine (50,000 ppm TDS, with approximately 12,000 ppm $Mg^{2+}$ and $Ca^{2+}$) and high hardness brine (50,000 ppm TDS, with approximately 12,000 ppm $Mg^{2+}$ and $Ca^{2+}$) containing 2% sodium tetraborate and 1% acetic acid. The pH was adjusted to approximately pH 7 at room temperature.

The phase behavior of both formulations was evaluated. The values for the optimum salinity and aqueous stability remained largely unchanged (±5%) upon addition of the borate-acid buffer. In all cases, the aqueous stability was greater than the optimum salinity.

Figure 2:
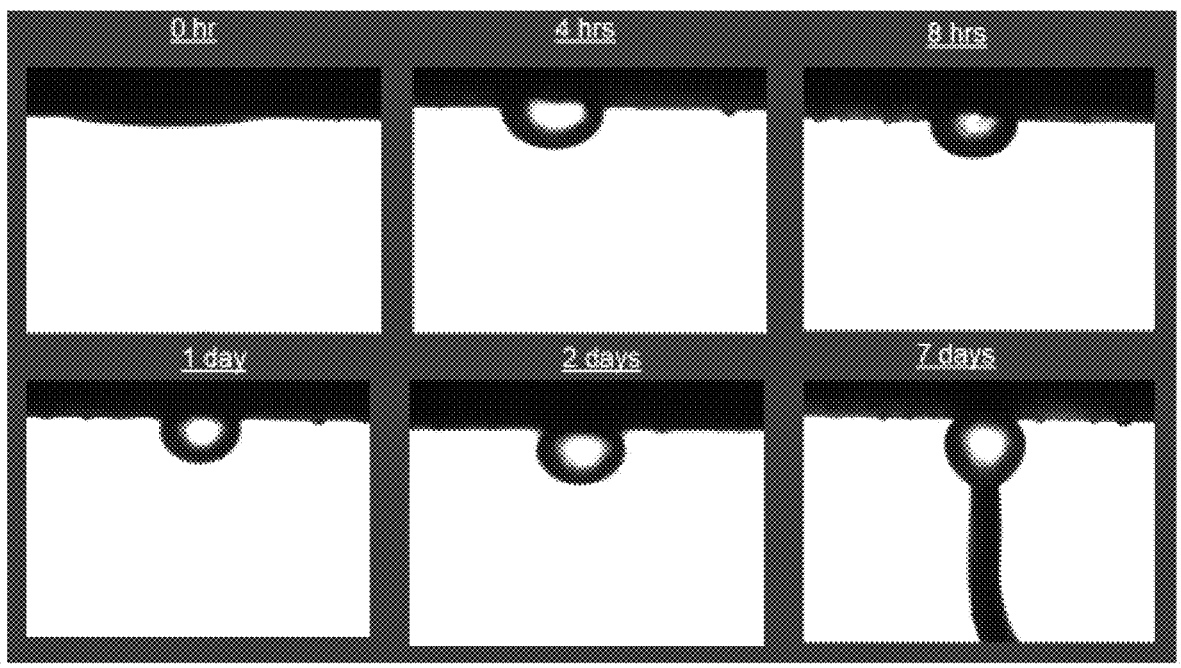
FIG. 2 shows images of oil contact angle measurements made using oil-wet carbonate samples immersed in a formulation that includes 0.9% Guerbet alkoxylated carboxylate, 1.2% olefin sulfonate, and 0.9% alkoxylated C12-C22 alcohol in high hardness brine (50,000 ppm TDS, with approximately 12,000 ppm $Mg^{2+}$ and $Ca^{2+}$) containing 2% sodium tetraborate and 1% acetic acid for various periods of time.

Carbonate substrates were aged in crude oil at reservoir temperature for 1 month. The aged substrates were the immersed in a solution (brine/surfactant solution) at 230° F. for varying duration of time (1 hr, 1 day, 5 days). The oil contact angles were then measure with the aqueous solution aged substrate at room temperature with crude oil and high hardness brine (~50,000 ppm). Contact angles were measured at 3 different points of the substrate and averaged. The results are shown in FIGS. 1-2 and Table 2.

TABLE 2

Contact Angle Measurements.

| Composition Tested | Oil Contact Angle Following Different Immersion Periods | | | | | |
|---|---|---|---|---|---|---|
| | 1 hr | 4 hrs | 8 hrs | 1 day | 2 days | 7 days |
| High Hardness Brine | 160° | 130° | 155° | 160° | 160° | 155° |
| High Hardness Brine + 2% Sodium Tetraborate + 1% Acetic Acid + Formulation B | 160° | 90° | 90° | 80° | 50° | <30° |

Results and Discussion

By incorporating a borate-acid buffer in a surfactant solution, neutron log signal can be improvement when measuring fluid saturation changes in single well pilots before and after surfactant injection. In these embodiments, a sodium tetraborate solution was buffered to pH<8 with acid to prevent precipitation of hardness ions (e.g., Ca and Mg ions) in injection and formation brines. For example, borate-acid buffer can include sodium tetraborate and acetic acid at pH=~7, and sodium tetraborate and citric acid at a similar pH range. In these instances, a mass ratio of 2 parts sodium tetraborate and 1-1.2 part acetic acid or citric acid were used. However, other borate compounds and/or acids may be used to prepare the borate-acid buffer.

The acid can be any acid (organic and inorganic). In some cases, the acid can be an organic acid. In certain cases, the organic acid can form a conjugate base upon deprotonation that can chelate divalent metal ions. Some examples of possible acids include acetic acid, citric acid, boric acid, tartaric acid, hydrochloric acid, succinic acid, as well as combinations thereof. The borate can be any water-soluble borate. Some examples of borates include sodium tetraborate, sodium tetraborate decahydrate, calcium tetraborate, sodium borate, sodium metaborate, as well as combinations thereof. Alternatively, borate-acid buffers can be formed by combining boric acid with a suitable alkali (e.g., sodium and potassium salts of the acids above).

The borate-acid buffer was found to chelate/sequestere divalent cations (e.g., $Ca^{2+}$ and $Mg^{2+}$) in the brine. This can improve surfactant stability and performance in the solution. In surfactant floods performed using borate-acid buffers and a blend of surfactants, improved propagation of the surfactant blend (with a decrease or no chromatographic separation) was observed. In addition, the borate-acid buffer improved surfactant stability and reduced absorption, retention, or any combination thereof during the course of the surfactant flooding operation. Further, in high hardness fluids (e.g., seawater), IOS surfactants precipitate in the presence of high hardness ions. By incorporating the borate-acid buffer, the hardness ions can be stabilized (e.g., through chelation of the hardness ions by the borate compound, the conjugate base/acid, or any combination thereof). This allows a wider range of surfactants, including surfactants such as IOS, that would typically precipitate in the presence of hardness ions, to be incorporated in the aqueous composition. Borate-acid buffers are significantly cheaper than commonly used chelants such as EDTA. Sequestering divalent cations can allow the use of lower cost surfactants that are typically incompatible with hard brines (e.g., for use in EOR operations). Likewise, the borate-acid buffer can similarly allow for other agents that are incompatible with hard brine (e.g., polymers, friction reducers, etc.) to be included in compositions comprising hard water or hard brine.

In addition to effective chelation, contact angle measurements showed that wettability alteration of oil-wet rock plugs to water-wet state occurred faster and to a greater degree in the presence of a borate-acid buffer and surfactant package. This suggests synergistic behavior between the borate-acid buffer and surfactants used to alter wettability. The borate-acid buffer (alone or in combination with one or more surfactants) can increase the wettability (water-wettability) of a formation. By including the borate-acid buffer, the kinetics of water-wettability can be enhanced (i.e., the water-wettability can be increased more quickly than with an identical formulation lacking the borate-acid buffer). In addition, the magnitude of the water-wettability can be enhanced (i.e., the formation can be made more water-wet than a formation treated with an identical formulation lacking the borate-acid buffer).

Further, the borate-acid buffer can buffer the acidity of hydrocarbons in a reservoir. By way of example, the sour crude reservoirs can contain $CO_2$ and $H_2S$, which can degrade certain surfactants that are unstable at low pH. In addition, certain anionic surfactants (e.g., carboxylates) can become protonated under reservoir conditions with high $CO_2$, $H_2S$, or any combination thereof, effectively altering surfactant performance in recovery operations performed in these reservoirs. By including the borate-acid buffer, these impacts can be minimized, allowing for a wider range of surfactants to be used in these applications.

Finally, by including the borate-acid buffer, components in the formulation (e.g., surfactants) which are pH sensitive can be protected from degradation. For example, the borate-acid buffer can improve the stability of alcohol ether carboxylate and sulfate surfactants (e.g., alcohol ether sulfate surfactants) from degradation due to long-term storage before use.

In view of these findings, the borate-acid buffers described herein can be incorporated into injection fluids used to improve oil recovery from petroleum reservoirs. The injection fluids may be brine, surfactant solution, polymer solution, surfactant polymer solution, foam, etc. If the injection fluids contain surfactants, the borate-acid buffer can be included into a concentrated surfactant blend (package) used to prepare the injection fluid. The applications can be conventional chemical EOR, brine chemistry optimization, and improved oil recovery by imbibition in low permeability and unconventional reservoirs. Borate-acid buffers can also be used to improve fracturing fluid performance by, for example, improving friction reducer and surfactant performance.

Example 2. Borates Improve the Performance of Example Surfactant Solutions

The performance of example surfactant formulations (with and without the addition of a borate-acid buffer) were evaluated. Specifically, phase behavior and coreflood studies were performed using two surfactant formulations with and without the addition of a borate-acid buffer.

The components of Formulations C-Formulation F are show in the table below. All formulations were prepared using a hard synthetic brine including $Na^+$, $Ca^{2+}$, $Mg^{2+}$, and $Cl^-$, and having a TDS of approximately 36,800 ppm. A 2:1 (by weight) mixture of sodium tetraborate and acetic acid was added as the example borate-acid buffer in Formulation D and Formulation E. The formulations were evaluated using example crude oils having viscosities of 2.1 cP at 95° C.

TABLE 2

Components of Example Formulations.

| | |
|---|---|
| Formulation C | 1% Guerbet alkoxylated carboxylate |
| | 1% olefin sulfonates |
| | 1% alkoxylated C12-C22 alcohol |
| Formulation D | 1% Guerbet alkoxylated carboxylate |
| | 1% olefin sulfonates |
| | 1% alkoxylated C12-C22 alcohol |
| | 1% sodium tetraborate buffer |
| Formulation E | 1% Guerbet alkoxylated carboxylate |
| | 1% olefin sulfonates |
| | 0.75% alkoxylated C12-C22 alcohol |
| Formulation F | 1% Guerbet alkoxylated carboxylate |
| | 1% olefin sulfonates |
| | 0.75% alkoxylated C12-C22 alcohol |
| | 0.5% sodium tetraborate buffer |

Figure 3:
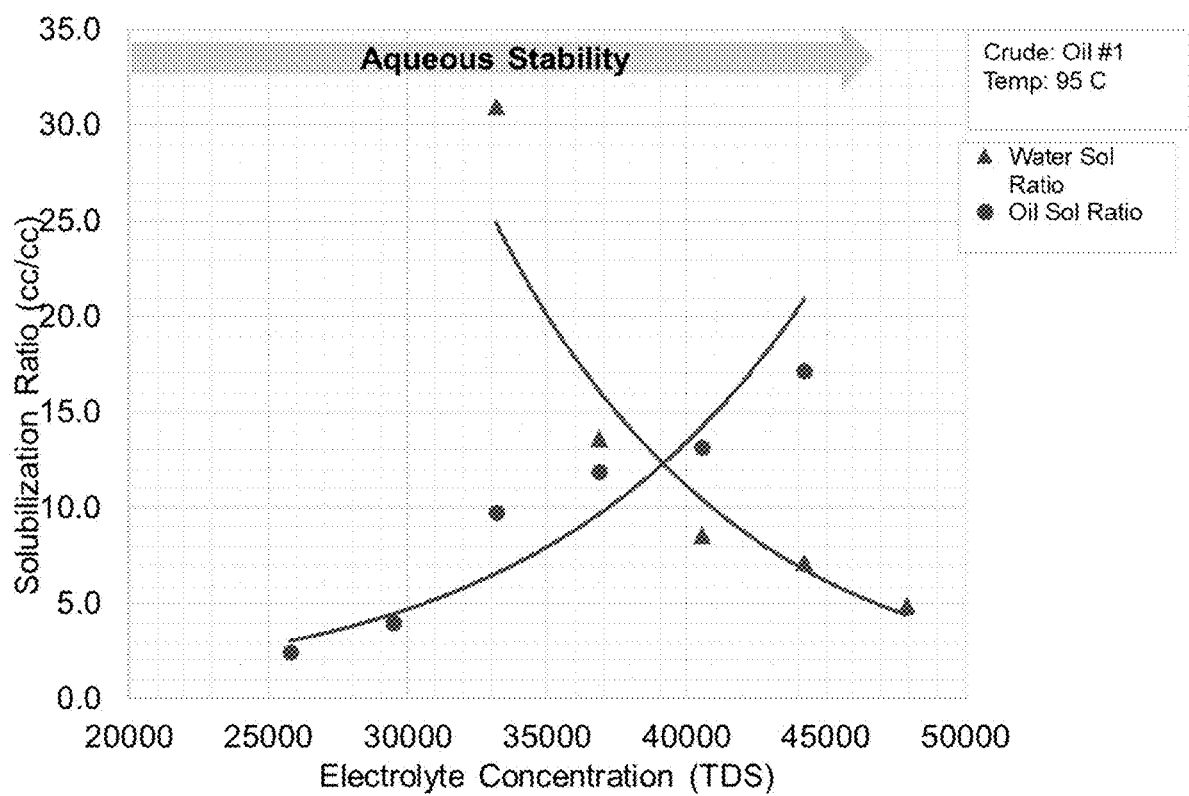
FIG. 3 is a plot showing emulsion phase behavior with Formulation C (without borate-acid buffer) with an example crude oil at 95° C.
Figure 4:
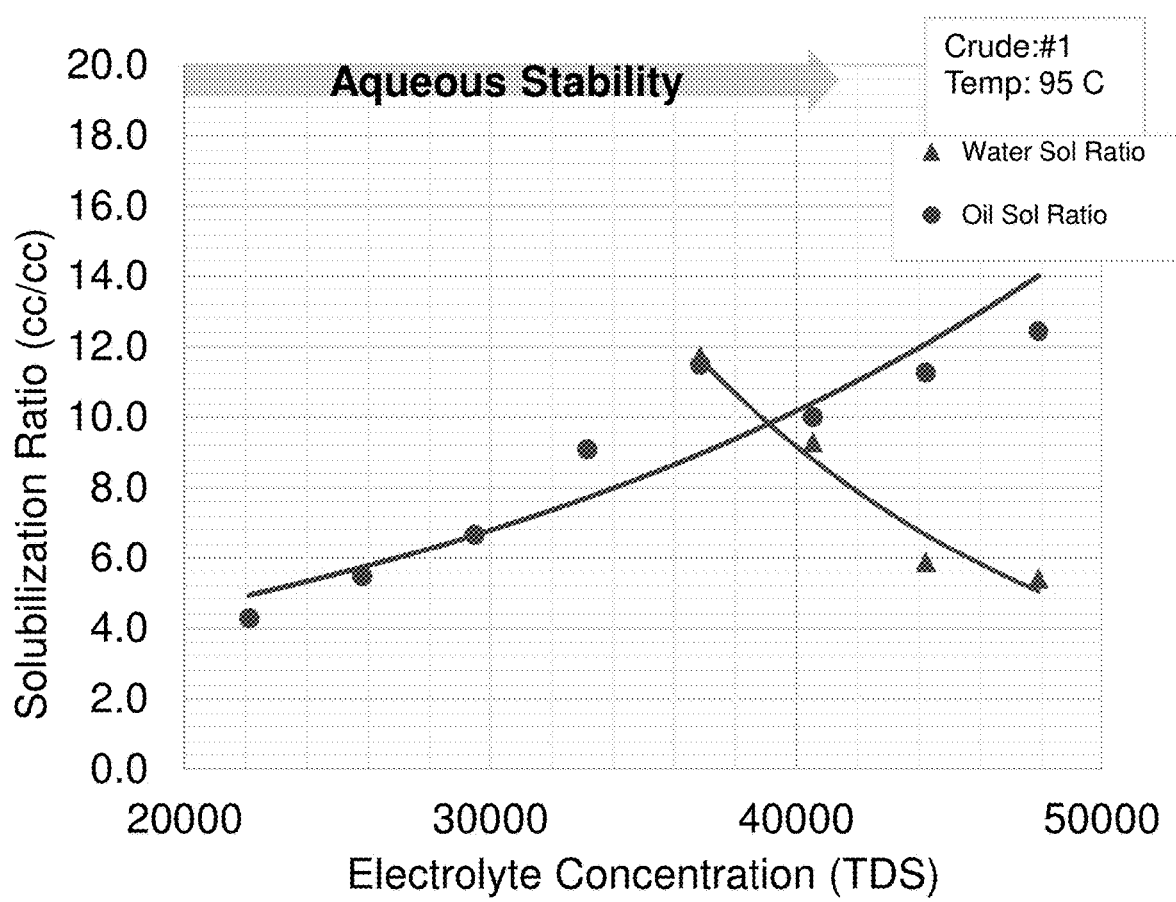
FIG. 4 is a plot showing emulsion phase behavior with Formulation D (including 1% by weight borate-acid buffer) with an example crude oil at 95° C.
Figure 5:
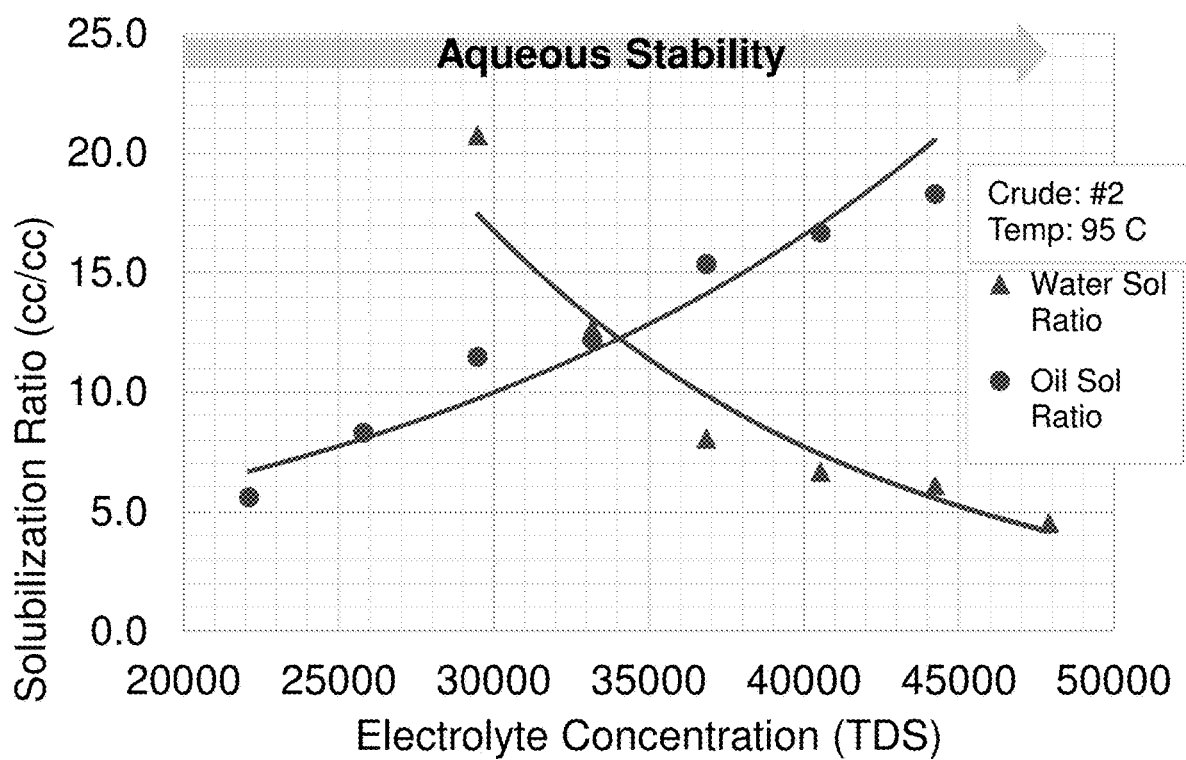
FIG. 5 is a plot showing emulsion phase behavior with Formulation F (including 0.5% by weight borate-acid buffer) with an example crude oil at 95° C.
Figure 6:
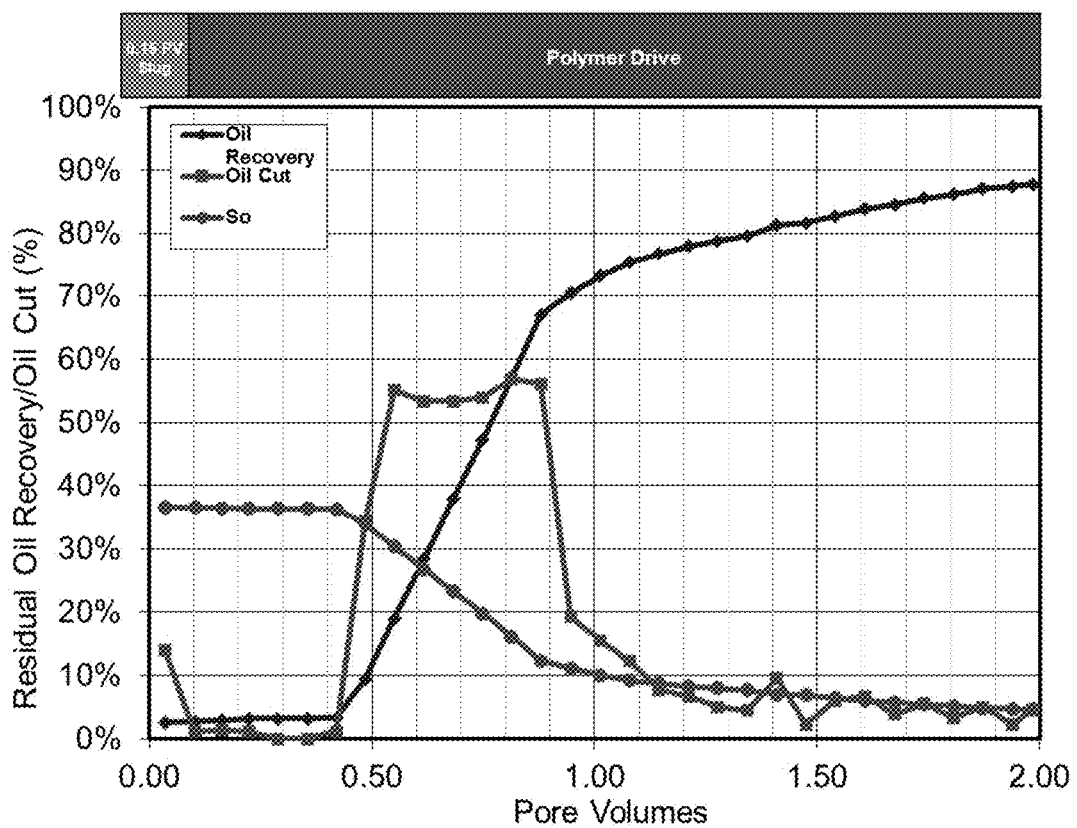
FIG. 6 is a plot showing the results of a coreflood study performed using Formulation C. Slug Injection: SP slug including 0.15 pore volume of Formulation C with 2000 ppm AMPS. Polymer drive included 1.85 pore volume ethoxylated alcohol surfactant and 3000 ppm AMPS. Core properties: Bentheimer Sandstone; 12"×2" length (inches). Study performed at 95° C. and a flow rate of 2 ft/da.

FIG. 3 is a plot illustrating the phase behavior of Formulation C (without borate-acid buffer) with an example crude oil at 95° C. For comparison, FIG. 4 is a plot illustrating the phase behavior of Formulation D (including 1% by weight borate-acid buffer) with an example crude oil at 95° C. FIG. 5 is a plot illustrating the phase behavior of Formulation F (including 0.5% by weight borate-acid buffer) with an example crude oil at 95° C. Addition of the borate-acid buffer did not significantly impact the aqueous stability (optimum salinity) of the surfactant formulations.

Figure 7:
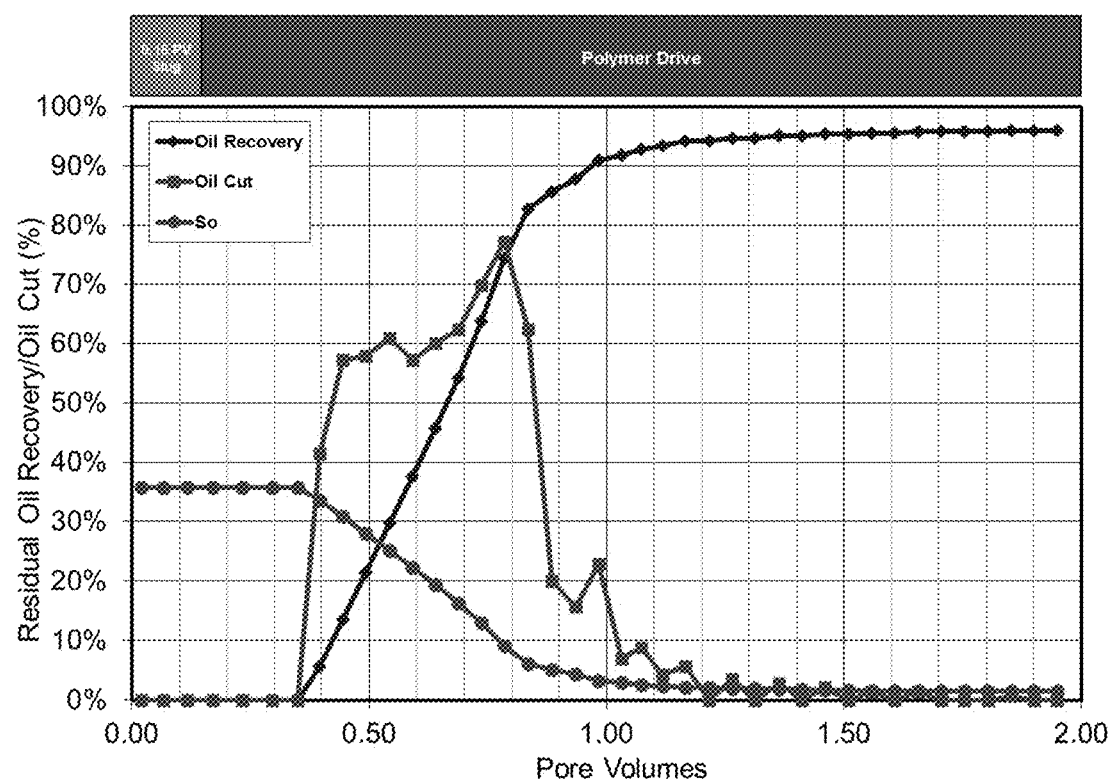
FIG. 7 is a plot showing the results of a coreflood study performed using Formulation D (including 1% by weight borate-acid buffer). Slug Injection: SP slug including 0.15 pore volume of Formulation D with 2000 ppm AMPS. Polymer drive included 1.85 pore volume ethoxylated alcohol surfactant and 3000 ppm AMPS. Core properties: Bentheimer Sandstone; 12"×2" length (inches). Study performed at 95° C. and a flow rate of 2 ft/da.
Figure 8:
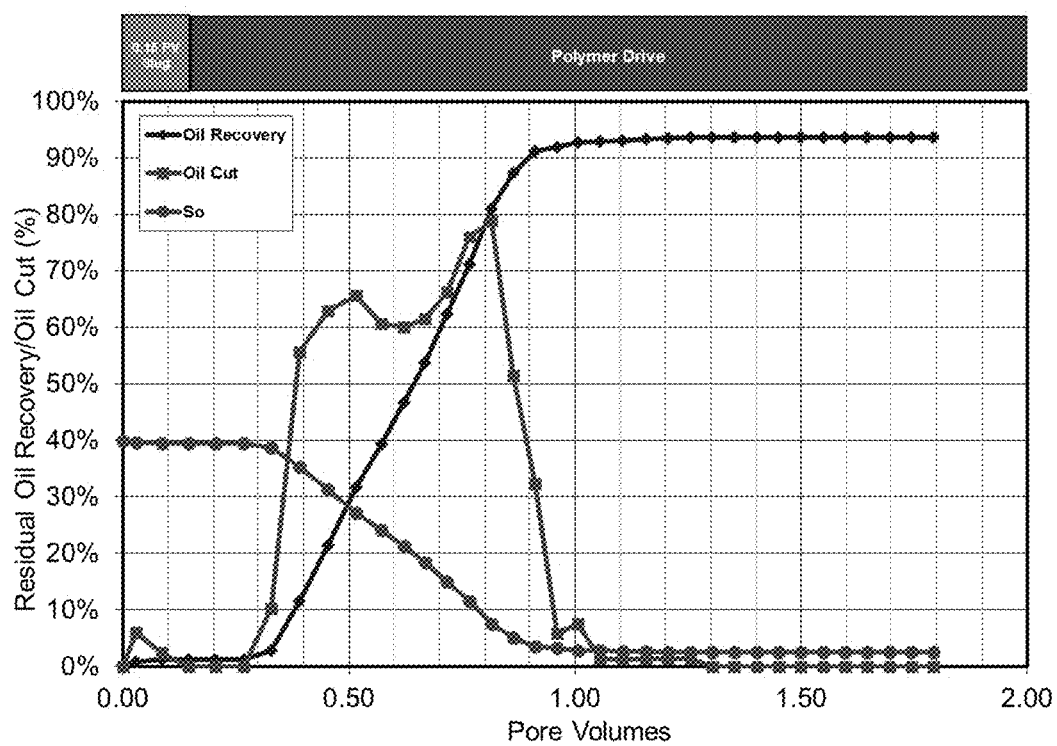
FIG. 8 is a plot showing the results of a coreflood study performed using Formulation F (including 0.5% by weight borate-acid buffer). Slug Injection: SP slug including 0.15 pore volume of Formulation F with 2000 ppm AMPS. Polymer drive included 1.85 pore volume ethoxylated alcohol surfactant and 3000 ppm AMPS. Core properties: Bentheimer Sandstone; 12"×2" length (inches). Study performed at 95° C. and a flow rate of 2 ft/da.
Figure 9:
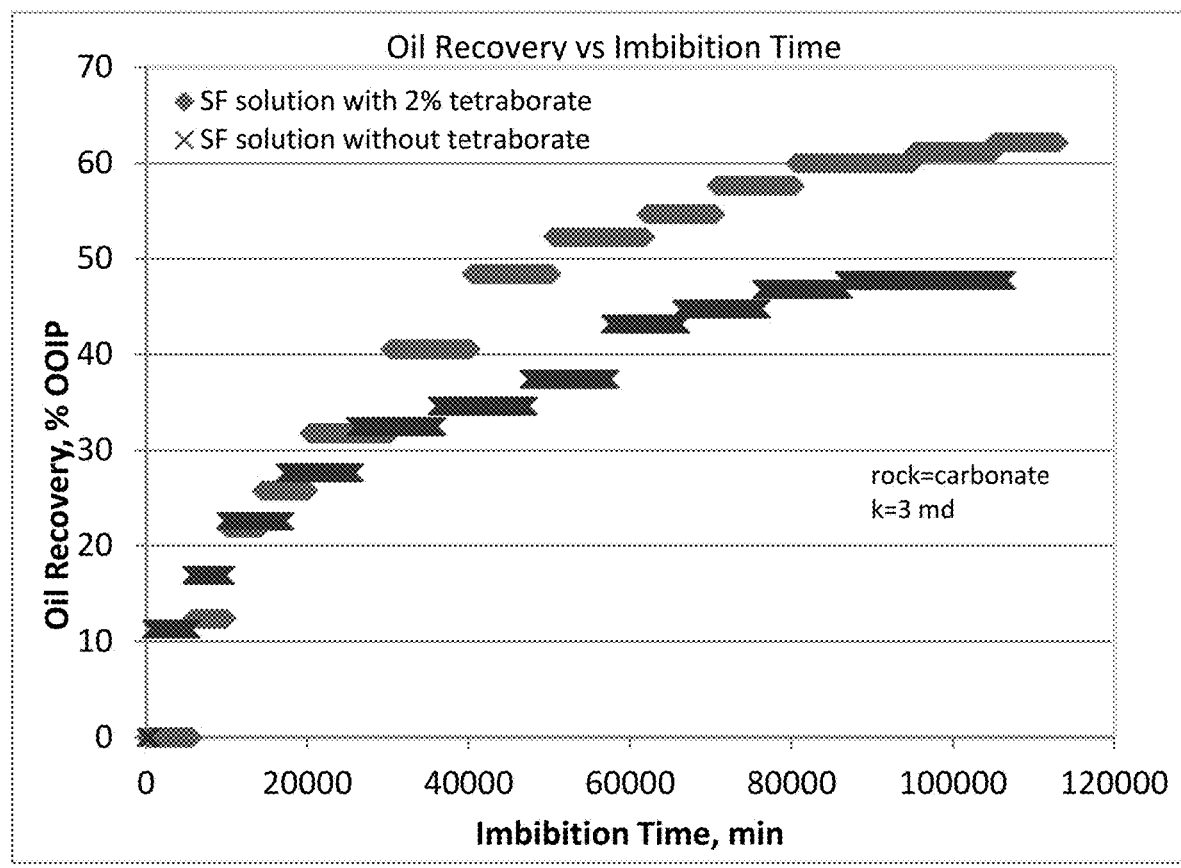
FIG. 9 is a plot showing the effect of a 2% borate-acid buffer (in surfactant solution) on imbibition recovery.

Coreflood experiments were conducted using sandstone cores (see FIGS. 7-9). Without a borate buffer, at one pore volume residual oil recovery was 72% (with 55% oil cut). Further, no surfactant production was observed. Upon addition of a borate-acid buffer, at one pore volume residual oil recovery increased to 91% (with 60-75% oil cut). Further, surfactant production was observed. This suggests reduced surfactant absorption/retention when a borate-acid buffer is included in the surfactant formulation. This result suggests that reduced quantities of surfactants can be used when incorporating a borate-acid buffer. This effect was observed to be particularly beneficial in the case of formulations that include a surfactant bearing a carboxylate moiety (e.g., a branched or unbranched C6-C32:PO(0-65):EO(0-100)-carboxylate).

Spontaneous imbibition tests with oil-wet carbonate core were conducted with a high pressure/high temperature imbibition cell. The core was saturated with 65-70% crude oil and placed inside the imbibition cell. The core was surrounded by fracture which is filled with an example surfactant solution (SF), optionally including 2% by weight of a borate-acid buffer (a 2:1 (by weight) mixture of sodium tetraborate and acetic acid). The test temperature was 230° F. and the test pressure was approximately 1000 psi. The oil production versus time was measured. The scope of this test was to evaluate how the addition of the borate-acid buffer to the SF solution enhanced oil recovery by (1) shifting wettability from oil-wet to water-wet and (2) reducing IFT between oil and water. The oil production was driven by capillary pressure induced by wettability alteration from oil-wet to water-wet and reduced IFT.

Figure 10:
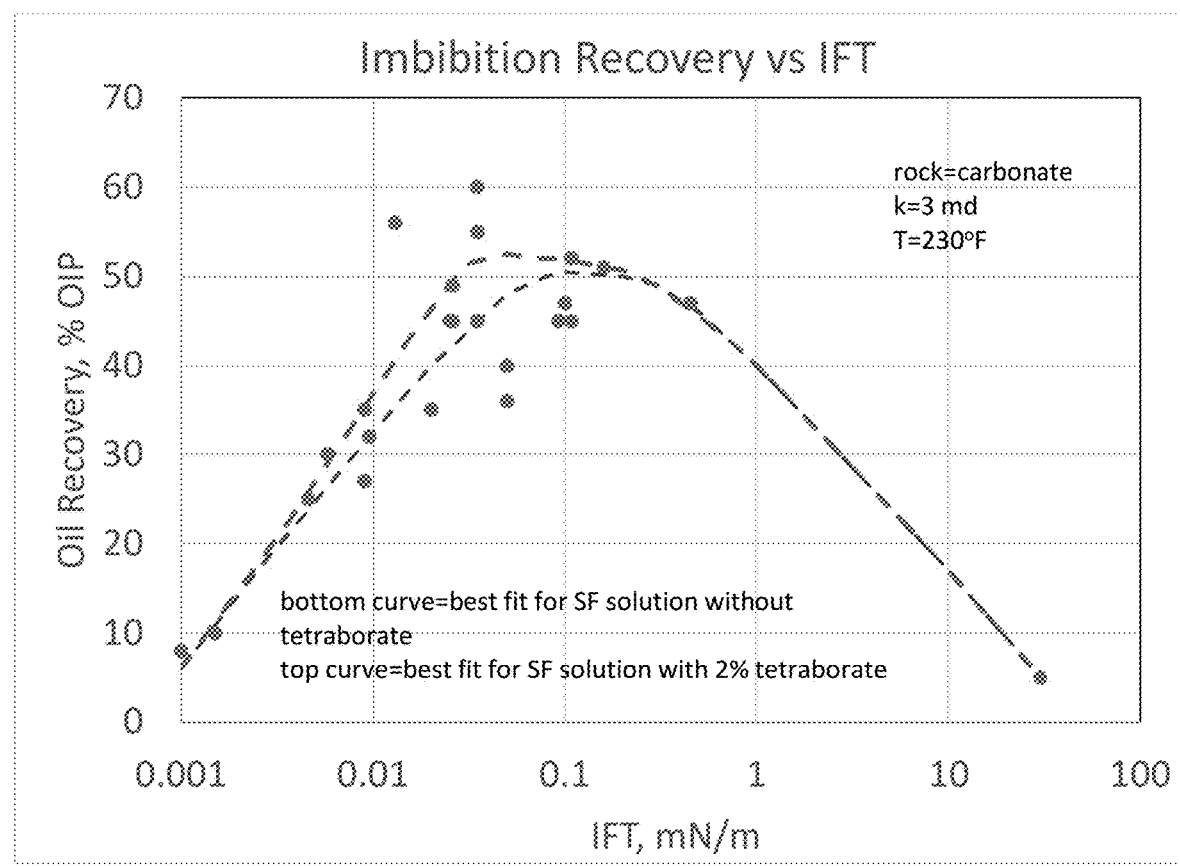
FIG. 10 is a plot showing the effect of addition 2% borate-acid buffer (in surfactant solution) on IFT.

FIG. 9 illustrates the effect of the borate-acid buffer on imbibition recovery. As shown in FIG. 9, the addition of the borate-acid buffer to the SF solution resulting in increased imbibition recovery, which confirms that the rock became more water-wet. FIG. 10 shows that the addition of the borate-acid buffer to the SF solution shifted the optimum IFT from 0.1 mN/m to 0.03 mN/m and the optimum imbibition recovery from 50 to 55%.

The compounds, compositions, and methods of the appended claims are not limited in scope by the specific compounds, compositions, and methods described herein, which are intended as illustrations of a few aspects of the claims. Any compounds, compositions, and methods that are functionally equivalent are intended to fall within the scope of the claims. Various modifications of the compounds, compositions, and methods in addition to those shown and described herein are intended to fall within the scope of the appended claims. Further, while only certain representative compounds, compositions, and method steps disclosed herein are specifically described, other combinations of the compounds, compositions, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for improving hydrocarbon recovery from a subterranean formation containing hydrocarbons therewithin, the method comprising:
   injecting an aqueous composition comprising (i) a borate-acid buffer, (ii) a surfactant package; (iii) water; and (iv) optionally a water-soluble polymer into the subterranean formation through a wellbore in fluid communication with the subterranean formation;

wherein the borate-acid buffer exhibits a capacity to buffer at a pH of from 6.0 to 8.5;

wherein the borate-acid buffer is present in an effective amount to chelate divalent metal ions present in the water or in water present in the subterranean formation.

2. The method of claim 1, wherein the wellbore is an injection wellbore; and wherein injection of the aqueous composition into the subterranean formation through the wellbore increases a flow of hydrocarbons to a production wellbore in fluid communication with the subterranean formation.

3. The method of claim 1, wherein the method for hydrocarbon recovery comprises an enhanced oil recovery (EOR) operation.

4. The method of claim 1, further comprising:

adding a tracer to the aqueous composition prior to introducing or along with the aqueous composition or through the wellbore into the subterranean formation;

recovering the tracer from fluids produced from the subterranean formation through the wellbore, fluids recovered from a different wellbore in fluid communication with the subterranean formation, or any combination thereof; and comparing the quantity of tracer recovered from the fluids produced to the quantity of tracer introduced.

5. The method of claim 1, wherein the hydrocarbons further comprise $CO_2$, $H_2S$, or any combination thereof.

6. The method of claim 1, wherein the borate-acid buffer is present in the aqueous composition in an amount of from 0.05% to 5% by weight, based on the total weight of the aqueous composition.

7. The method of claim 1, wherein the borate-acid buffer exhibits a capacity to buffer at a pH of from 6.0 to 8.0.

8. The method of claim 1, wherein the borate-acid buffer comprises a borate compound and a conjugate base of an acid.

9. The method of claim 8, wherein the borate compound comprises sodium tetraborate, calcium tetraborate, sodium borate, sodium metaborate, or any combination thereof.

10. The method of claim 8, wherein the conjugate base comprises acetate, citrate, tartrate, succinate, or any combination thereof.

11. The method of claim 8, wherein the borate compound and the conjugate base of the organic acid are present at a weight ratio of from 1:1 to 5:1.

12. The method of claim 1, wherein the borate-acid buffer comprises a boric acid and an alkali.

13. The method of claim 1, wherein the aqueous composition comprises a surfactant package, and wherein the surfactant package comprises a primary surfactant and optionally one or more secondary surfactants.

14. The method of claim 13, wherein the primary surfactant comprises an anionic surfactant, such as a sulfonate, a disulfonate, a sulfate, a disulfate, a sulfosuccinate, a disulfosuccinate, a carboxylate, a dicarboxylate, or any combination thereof.

15. The method of claim 14, wherein the anionic surfactant comprises one of the following:

a branched or unbranched C6-C32:PO(0-65):EO(0-100)-carboxylate;

a C10-C30 internal olefin sulfonate;

a C8-C30 alkyl benzene sulfonate (ABS);

a sulfosuccinate surfactant;

a surfactant defined by the formula below $$R^1-R^2-R^3$$

wherein $R^1$ comprises a branched or unbranched, saturated or unsaturated, cyclic or non-cyclic, hydrophobic carbon chain having 6-32 carbon atoms and an oxygen atom linking $R^1$ and $R^2$;

$R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups; or a surfactant defined by the formula below wherein $R^4$ is, individually for each occurrence, a branched or unbranched, saturated or unsaturated, cyclic or non-cyclic, hydrophobic carbon chain having 6-32 carbon atoms; and M represents a counterion.

16. The method of claim 13, wherein the primary surfactant comprises a non-ionic surfactant, such as a branched or unbranched C6-C32:PO(0-65):EO(0-100).

17. The method of claim 13, wherein the primary surfactant has a concentration within the composition of from 0.05% to 5% by weight, based on the total weight of the aqueous composition.

18. The method of claim 1, wherein the composition further comprises a polymer, a friction reducer, a gelling agent, a crosslinker, a breaker, a pH adjusting agent, a non-emulsifier agent, an iron control agent, a corrosion inhibitor, a scale inhibitor, a biocide, a clay stabilizing agent, a chelating agent, a proppant, a wettability alteration chemical, a co-solvent, or any combination thereof.

19. The method of claim 1, wherein the borate-acid buffer is present in the aqueous composition in an amount of from 0.1% to 5% by weight, based on the total weight of the aqueous composition.

20. The method of claim 1, wherein when present the water-soluble polymer comprises a synthetic polymer.

21. The method of claim 1, wherein when present the water-soluble polymer comprises polyacrylamide or a copolymer thereof.

22. The method of claim 1, wherein the surfactant package comprises a primary surfactant comprising a branched or unbranched C6-C32:PO(0-65):EO(0-100)-carboxylate, a dicarboxylate, or any combination thereof.

23. The method of claim 1, wherein the divalent metal ions comprise $Mg^{2+}$, $Ca^{2+}$, or any combination thereof.

* * * * *